ular area are circumferentially mounted on the body means. An actuating means, such as a hydraulic cylinder, is provided for actuating the pipe gripping means into locking engagement with the pipe and for applying an axial force to the compression sealing members for radially expanding the sealing members into engagement with the pipe wall. The ratio of the body means pressure head area to the sealing members annular area cooperates with the fluid differential pressure applied to the body means pressure head to convert said differential pressure into additional predetermined radial sealing pressure below the yield strength of the pipe.

United States Patent [19]

Wittman et al.

[11] 4,422,477
[45] Dec. 27, 1983

[54] PRESSURE ENERGIZED PIPELINE PLUG

[75] Inventors: Robert H. Wittman; David E. Adkins; Ronnie E. Haws, all of Houston, Tex.

[73] Assignee: Hughes Tool Company, Houston, Tex.

[21] Appl. No.: 238,713

[22] Filed: Feb. 27, 1981

[51] Int. Cl.³ ............................................. F16L 55/10
[52] U.S. Cl. ........................................ 138/89; 405/170
[58] Field of Search ..................... 138/89, 90, 93, 97; 405/170

[56] References Cited

U.S. PATENT DOCUMENTS 3,943,982  3/1976  Lecordier ............................ 138/89
3,978,892  9/1976  Scodino ............................... 138/89
4,332,277  6/1982  Adkins et al. ....................... 138/89

Primary Examiner—James E. Bryant, III
Attorney, Agent, or Firm—Robert A. Felsman

[57] ABSTRACT

A plugging apparatus is disclosed for plugging the bore of a pipe at a selected location and withstanding a pressure differential thereacross that may equal or exceed the designed working fluid pressure of the pipe and includes a body means adapted for insertion into the pipe bore and for axial movement within the pipe, the body means including an upstream pressure head having a selected projected area and support means (which can conveniently be pigging discs) attached to and cooperating with the body means for supporting the body means axially in the pipe during movement in the pipe. A pipe gripping means is carried by the body means, locking engagement with the inside surface of the pipe. A plurality of annular elastomeric sealing memebers having a selected annular area are circumferentially mounted on the body means. An actuating means, such as a hydraulic cylinder, is provided for actuating the pipe gripping means into locking engagement with the pipe and for applying an axial force to the compression sealing members for radially expanding the sealing members into engagement with the pipe wall. The ratio of the body means pressure head area to the sealing members annular area cooperates with the fluid differential pressure applied to the body means pressure head to convert said differential pressure into additional predetermined radial sealing pressure below the yield strength of the pipe.

14 Claims, 18 Drawing Figures

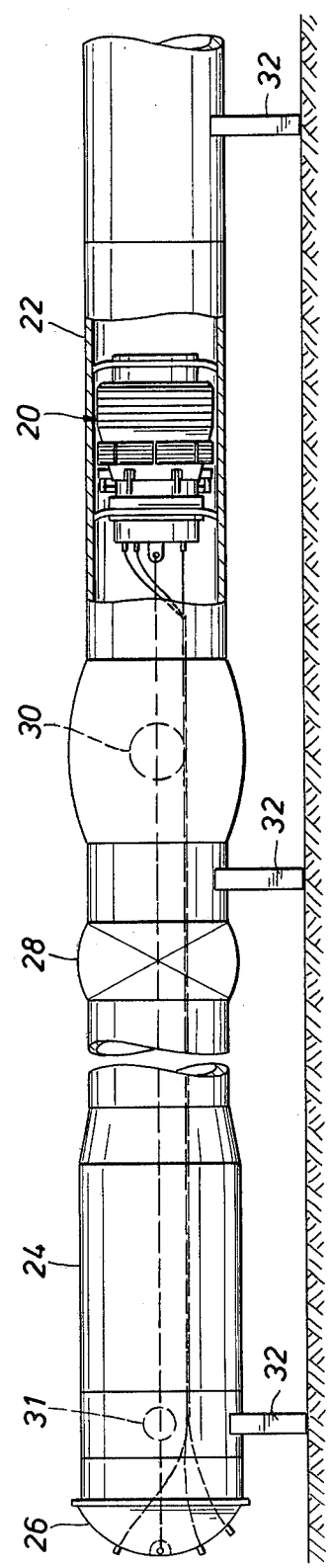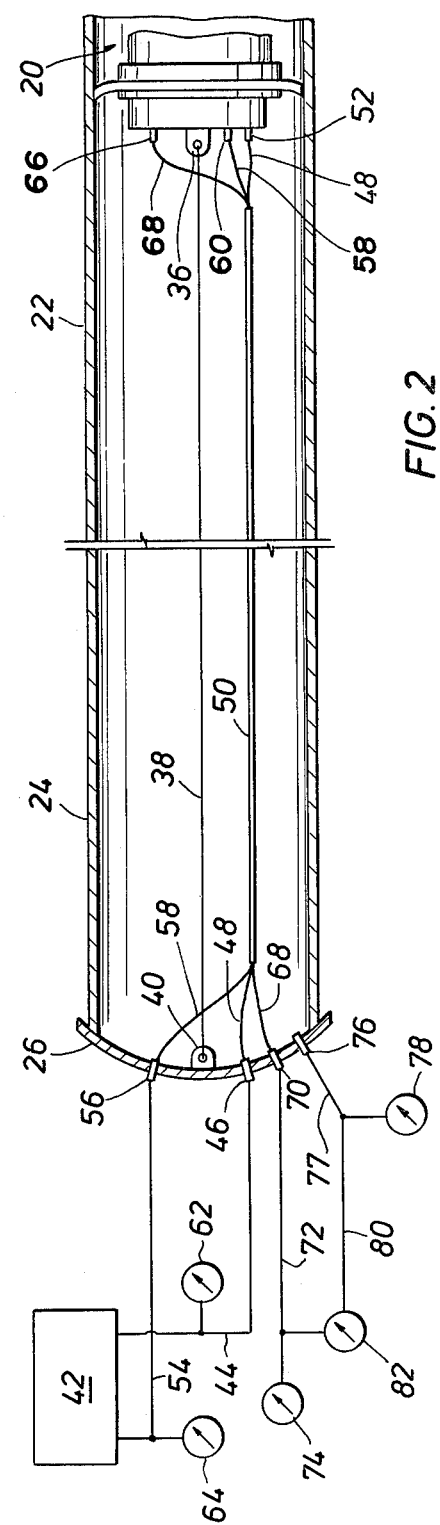

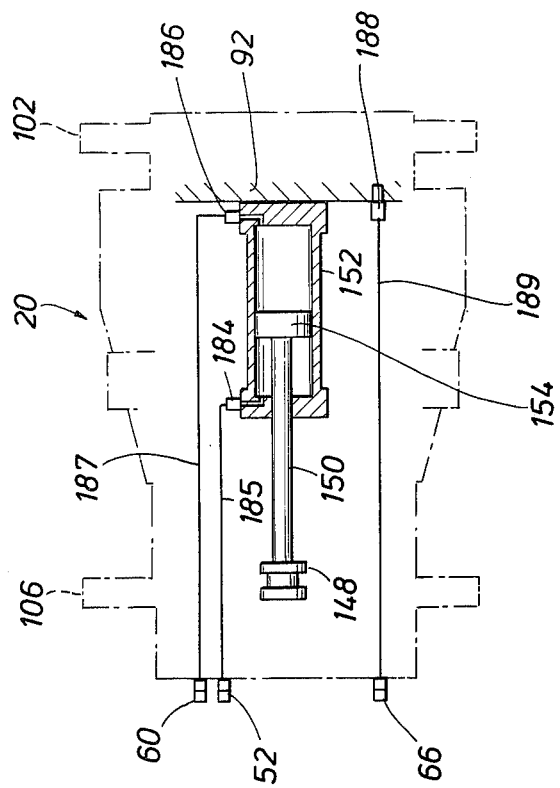
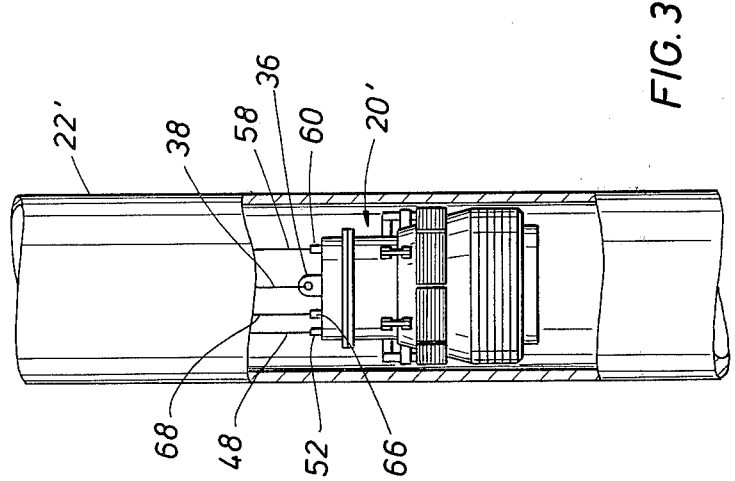

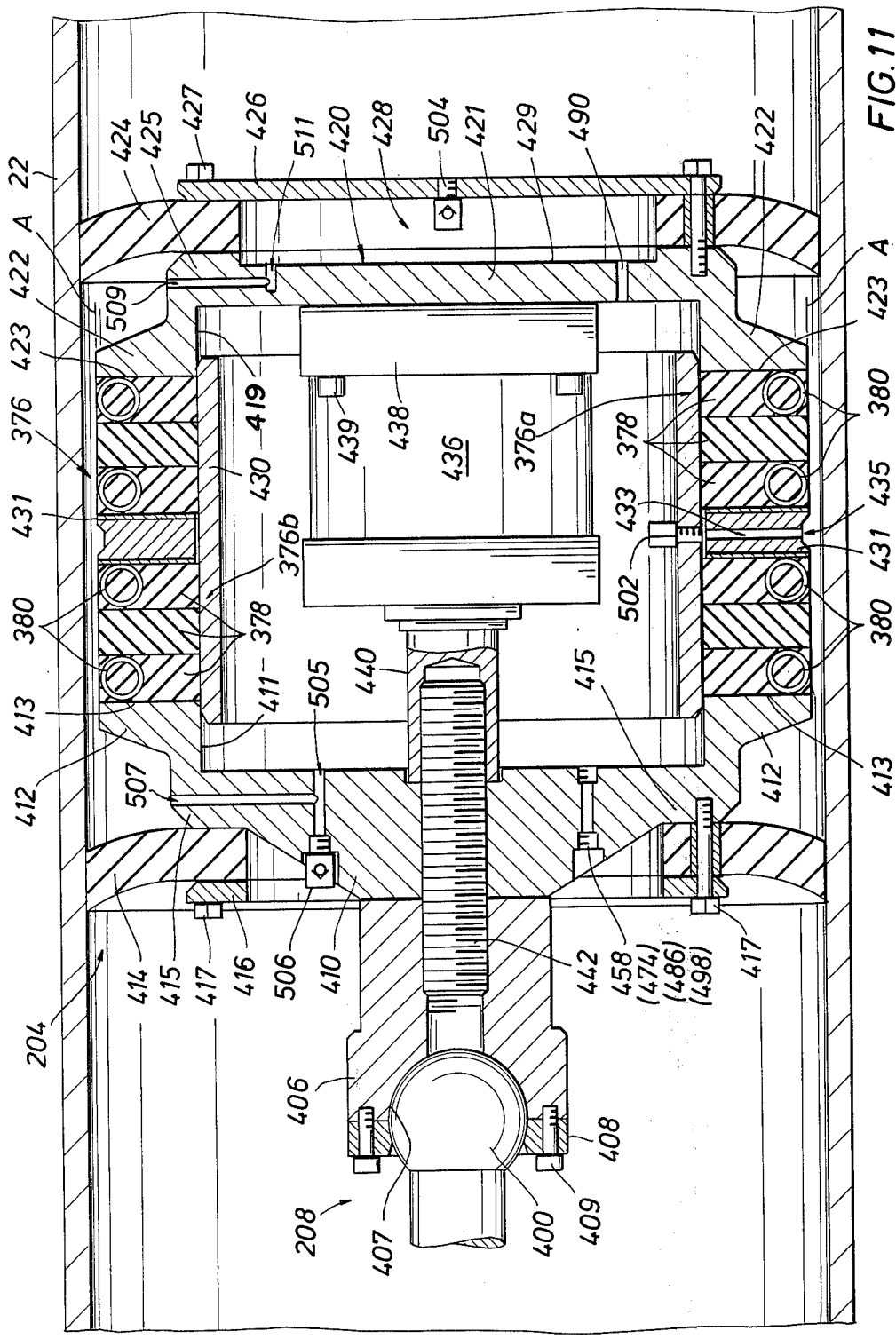

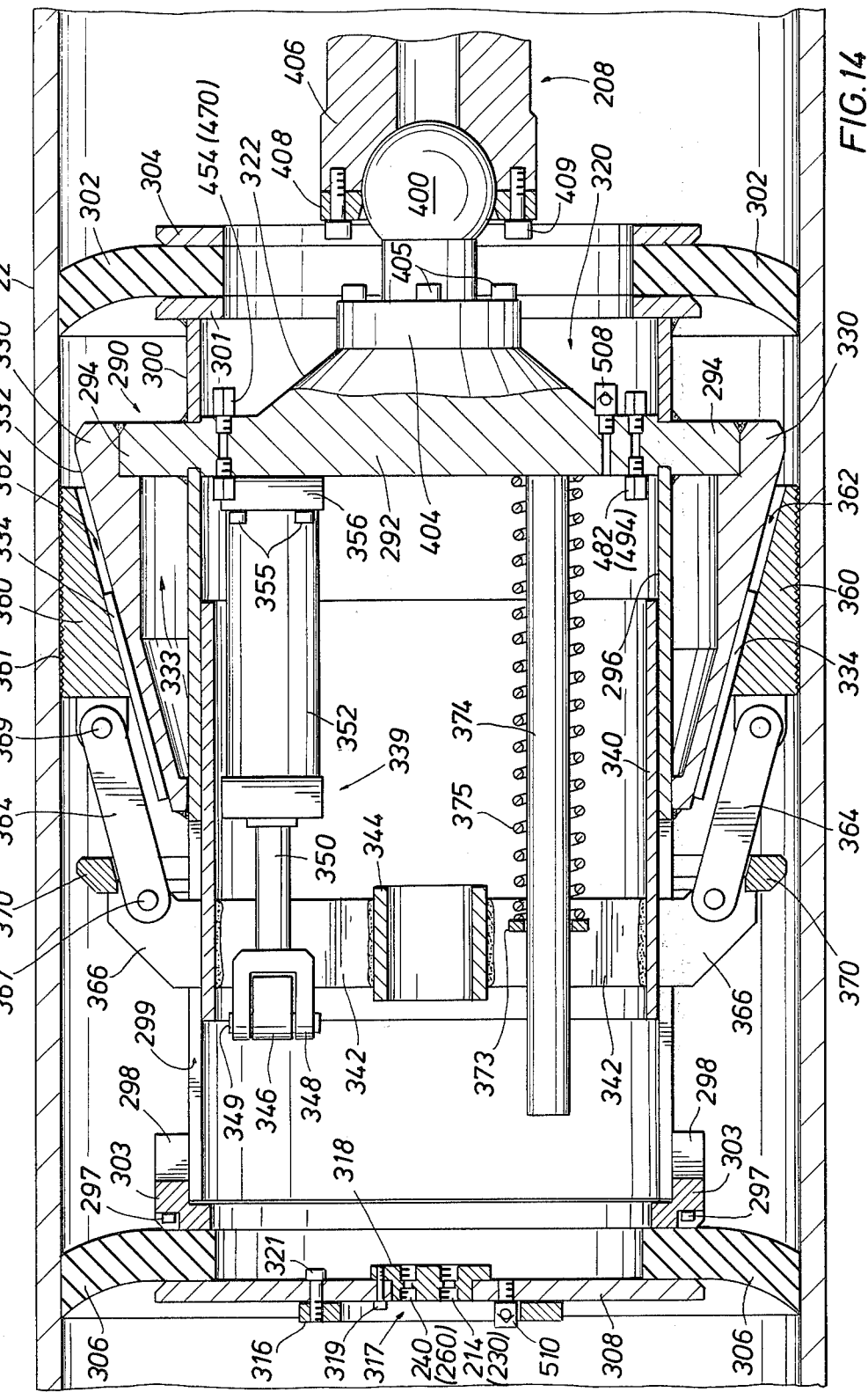

PRESSURE ENERGIZED PIPELINE PLUG

BACKGROUND OF THE INVENTION

1. Field of the Invention

This invention relates to pipeline plugging devices, and in particular to a pipeline plugging apparatus that is self-energized by pipeline differential pressure across the plugging apparatus in which the radial sealing and locking pressures exerted against the pipeline are controlled to a predetermined value.

2. Description of the Prior Art

There have been a number of prior art plugging devices developed for positioning in a pipeline, either by being pigged, cable towed or motor driven, for plugging the pipeline in the event of detection of buckling or breaks in the pipeline, or to provide a downstream fluid-free environment for work or repair of the pipeline. The prior art devices that gauge the pipe for buckle detection or for detecting water due to leaks have used slips to wedge into locking engagement with the inner surface of the pipeline wall and a variety of sealing means to seal the pipeline.

However, all of these devices have operated at low pressures that have not exceeded the hydrostatic head of the seawater at the pipeline plugging depth. The prior art devices have generally not been self-energizing to a controlled extent in response to differential pressures in the pipeine across the set plugging device due to the working fluid pressure in the pipeline. In addition, such prior art devices have not disclosed means for exerting predetermined locking and sealing pressures against the inner pipeline wall in response to a known pipeline fluid pressure in order to prevent overstressing the pipe beyond its designed yield strength.

The following U.S. Patents are representative of the known prior patented art: U.S. Pat. Nos. 3,978,678 (Duncan, et al); 3,943,982 (Lecordier); 3,746,026 (Herring); 3,690,348 (Patterson); 3,593,749 (Reardon); and 3,525,226 (McCarron).

SUMMARY OF THE INVENTION

Accordingly, it is a general object of this invention to provide an improved pipeline plugging apparatus that is responsive to differential pressure exerted by the pipeline fluid up to and sometimes exceeding the working pressure locking and sealing the plugging apparatus in the pipeline.

It is a further object of this invention to provide an improved pipeline plugging apparatus that is responsive to a known pressure of the pipeline fluid exerting a predetermined differential pressure across the plugging apparatus for converting axial loading forces resulting from the differential pressure into predetermined radial locking and sealing pressures against the inner surface of the pipeline for maximum sealing effectiveness below the designed yield strength of the pipe.

In accordance with these objects, a plugging appartus is disclosed for plugging the bore of a pipe at a selected location and withstanding a pressure differential thereacross that equals or exceeds the designed working fluid pressure of the pipe that includes, a generally cylindrical body means adapted for insertion into the pipe bore and for axial movement within the pipe, the body means including a pressure head having a selected surface area, and support means (which can conveniently be pigging discs) attached to and cooperating with the body means for supporting the body means axially in the pipe during movement in the pipe. A pipe gripping means, which may conveniently be a radial slip assembly, is concentrically mounted on the body means, for locking engagement with the inside surface of the pipe in response to axial force applied to the slips. A plurality of annular compression sealing members having a selected annular area are circumferentially mounted on the body means for radially expanding in response to axial force applied thereto for sealingly engaging the inside surface of the pipe and converting applied axial forces into radial sealing pressures in a predetermined relationship.

An actuating means, such as a hydraulic cylinder, is provided for applying a predetermined axial force to the gripping means for moving the slips into locking engagement with the pipe and for exerting a predetermined axial force to the compression sealing members for causing radial expansion and sealing engagement with the pipe. The ratio of said pressure head area to said seal means annular area cooperates with the fluid differential pressure applied to said pressure head to convert said pressure differential into a predetermined sealing means radial pressure applied to the pipe wall that is below the yield strength of the pipe. The axial loading force applied to the compression sealing members is also transmitted through the seals to the gripping means for conversion into additional locking pressure.

Accordingly, by controlling the above described ratio, and knowing the pressure of the fluid in the pipeline, the radial sealing pressures can be accurately controlled to provide maximum sealing effectiveness without overstressing the pipeline beyond its designed yield strength.

The plugging apparatus may conveniently be mounted on a single module, or where pipeline bend radii do not permit passage of a single module, a multiple module apparatus may be provided. A dual module plugging apparatus is disclosed in which the gripping means is mounted on one module and the compression sealing members are mounted on a second module. The pair of modules are structurally connected by a ball and socket articulated connection that provides bending movement and axial deflection of the modules with respect to each other. The ball and socket connection provides structural means to transmit the forces created by means such as the differential pressure exerted against the pressure head of the sealing module to the gripping means module.

Another embodiment may omit the pigging discs and the plug may be vertically positioned by means of a cable and winch, for positioning the plugging apparatus in the riser of a pipeline or in an oil or gas well casing.

BRIEF DESCRIPTION OF THE DRAWINGS

FIG. 1 is a side elevation view of a conventional pipeline pig launching apparatus partially broken away and showing a single module pipe plugging apparatus according to this invention.

FIG. 2 is a fragmentary view of the pipeline pig launching apparatus shown in FIG. 1 and including a simplified hydraulic schematic for operating the pipe plugging apparatus shown in FIG. 1.

FIG. 3 is a side elevation view of the single module pipe plugging apparatus according to this invention shown suspended in a vertically oriented pipe for plugging the bore thereof.

FIG. 6 is a schematic side elevation view of the hydraulic actuating assembly of the single module apparatus showing the internal schematic of the hydraulic system.

FIG. 11 is a vertical cross-section of the sealing module according to this invention and shown supported in a pipeline in its unseated position.

FIG. 14 is a vertical cross-section of the slip module according to this invention shown in its locked position in the pipeline.

DESCRIPTION OF THE PREFERRED EMBODIMENT

Figure 4:
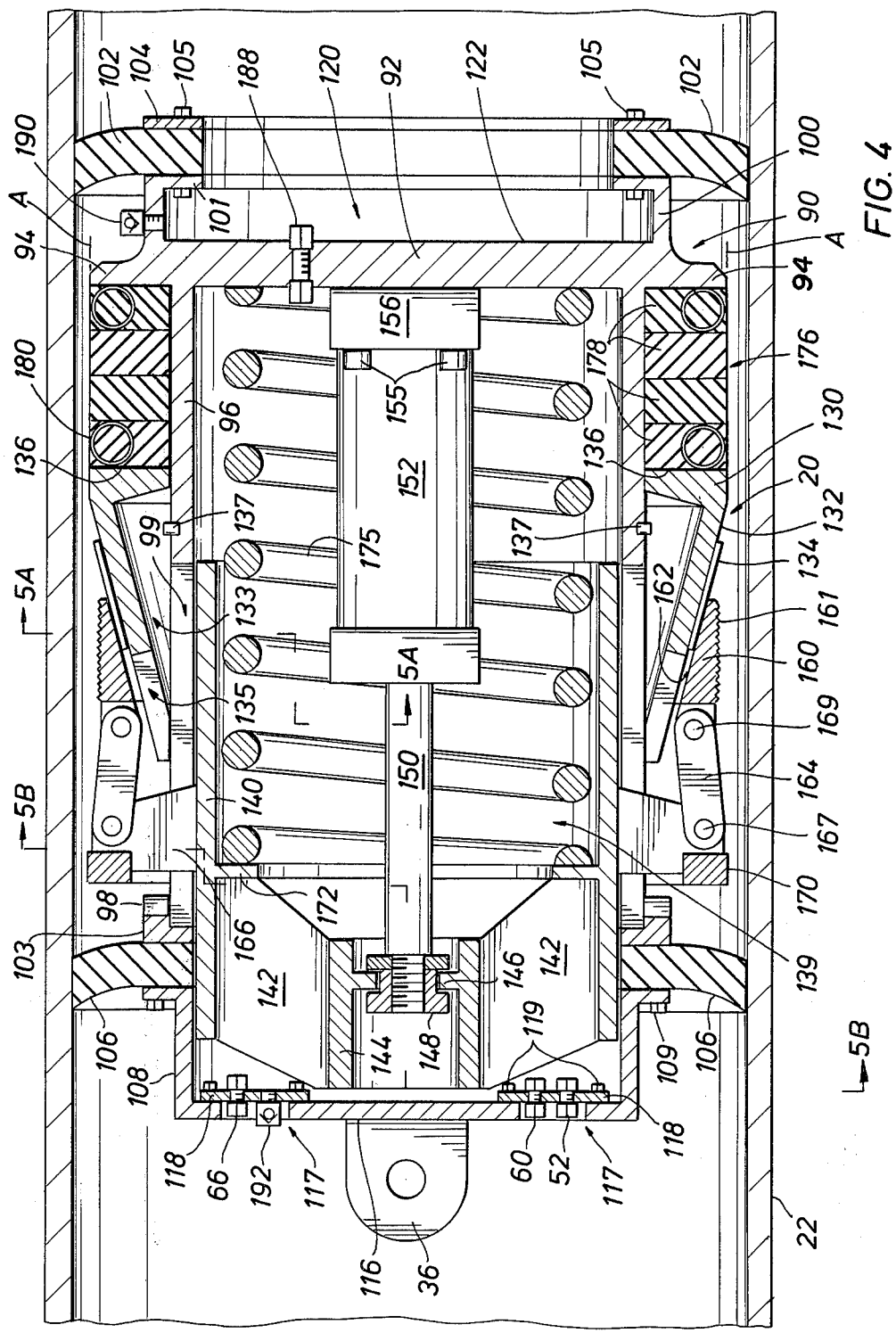
FIG. 4 is a vertical cross-section of the single module pipe plugging apparatus shown supported in the pipeline in its unlocked position.

Referring now to FIG. 1, a single module pipe plugging apparatus 20 is shown inserted in a pipeline 22 through a conventional pipeline pig launcher 24 and an access door 26, which is shown in its closed position. After positioning the plugging apparatus 20 in the launcher 24, fluid pressure is applied through an inlet tee 31 to move the plugging apparatus 20 through valve 28 and past a second inlet tee 30 into pigging position in pipeline 22. The pipeline 22, launcher 24, valve 28 and tees 30 and 31 are shown supported on conventional structural supports 32.

The pressurized fluid control system for the plugging apparatus 20 will now be described with reference to FIG. 2. The actuating fluid can be a pressurized fluid such as a pressurized hydraulic or pneumatic system. However, since the preferred embodiment employs a hydraulic fluid system, the control system will be hereinafter described as a hydraulic system for the sake of convenience.

The rear end of the plugging apparatus 20 is shown positioned within pipeline 22, while the hydraulic supply and control system is shown schematically outside of the access door 26 of the pig launcher 24. Apparatus 20 is connected to the access door 26 by means of a connector 36 attached to the plugging device 20 and to which is connected a tether in the form of a steel cable 38, which in turn is connected to a structural connector 40 fastened inside of the access door 26. It should be understood that upon insertion of the plugging apparatus 20 into pipeline 22, a sufficient amount of steel cable 38 will be coiled behind plug 20 to permit plug 20 to be moved or pigged to a desired location within pipeline 22 by selecting the desired length of steel cable 38.

However, it is also to be understood that other positioning means may be used as, for example, the plug 20 may have a magnetic, radioactive or acoustical means carried therewith, such that its location can be monitored externally and the pigging operation terminated when the plug 20 has arrived at the desired location.

To control the single module plugging apparatus 20 disclosed herein, an external source of hydraulic or pneumatic power is utilized. For example, a hydraulic power supply 42, capable of producing up to 5,000 p.s.i. or the like, is shown connected by a hydraulic line 44 to a hydraulic connector 46 mounted in access door 26. Line 44 and connector 46 supply hydraulic fluid to "lock" plugging apparatus 20 as will be hereinafter described in greater detail. Connector 46 is connected to a flexible hydraulic line or hose 48 which is bundled with other hydraulic lines to form a cable or hose bundle 50 which is deployed in pipeline 22. Line 48 then connects to connector 52 which provides hydraulic fluid internally to the actuating means of plugging apparatus 20 to lock or set the plugging apparatus.

Hydraulic power supply 42 is also connected to hydraulic connector 56 mounted in access door 26 by means of a hydraulic line 54. Connector 56 and line 54 provide hydraulic fluid to "unlock" the single module plugging apparatus 20 as will be hereinafter described in greater detail. Connector 56 is connected to hydraulic line 58 which forms a part of cable 50 and then connects to a hydraulic connector 60 mounted in the end of plugging apparatus 20 and is connected to the actuating means therein to unlock and unseal the apparatus 20.

The "lock" line 44 may be provided with a pressure gauge 62 to monitor fluid pressure within the line. Similarly, the "unlock" line 54 may be provided with a suitable pressure gauge 64 for monitoring the fluid pressure therein. A hydraulic connector 76 is mounted in access door 26 and is connected through line 77 to a pressure gauge 78 for monitoring the pigging pressure in pipeline 22 while the plugging apparatus 20 is being positioned.

It is generally desirable to also have means for detecting the fluid pressure on the high pressure side of plugging apparatus 20. For that purpose, there is provided a connector 66 shown mounted in the end of plugging apparatus 20, and which is connected by hydraulic line 68 to a hydraulic connector 70 mounted in access door 26. The connector 66 mounted in plugging apparatus 20 is connected to a means for sensing the pressure on the high pressure end of plugging apparatus 20 as will be hereinafter further described. Hydraulic connector 70 is then connected through a hydrualic line 72 to a pressure gauge 74 for monitoring the high pressure ahead of the plugging apparatus 20. Further, a pressure gauge 82 could be mounted in hydraulic line 80 connected between hydraulic lines 77 and 72 for purposes of reading the differential pressure across plugging apparatus 20.

Of course, it is understood that sufficient coiled lines 48, 58 and 68 and cable 50 will be provided inside launcher 24 to extend the same distance or at least as far as the steel cable tether 38. Alternatively, instead of a coil of lines, hydraulic or pneumatic coil winch means may be placed in launcher 24 to control the amount of payout of lines during pigging movement of plugging apparatus 20.

FIG. 3 shows an alternate embodiment of the single module plugging apparatus shown suspended within a vertical pipe 22' which may be a vertical riser from a pipeline, or it may be the casing of an oil or gas well. Plugging apparatus 20' does not have pigging discs and is shown supported and suspended within vertical pipe 22' by means of a connector 36 attached to the upper end of plugging apparatus 20' and connected to a surface winch or hoisting means (not shown) by means of a steel cable 38 for positioning plugging apparatus 20' vertically within pipe 22'. Plugging apparatus 20' may be actuated by means of the pressurized fluid supply and control system shown schematically in FIG. 2. Accordingly, hydraulic connectors 52, 60 and 66 are shown connected to the upper end of plugging apparatus 20', and are shown connected to hydraulic lines 48, 58 and 68 for control and monitoring purposes utilizing the hydraulic supply and control system shown in FIG. 2 and as hereinabove described.

In this embodiment, the plugging apparatus 20' is raised or lowered within pipe 22' to its desired position by means of cable 38, and then actuated by means of the pressurized fluid supply and control system hereinabove described. However, plug 20' does not need the pig launching and valving arrangement in pipe 22' as hereinabove previously described for the pipeline pigging embodiment of the single module plugging device 20.

Figure 5A:
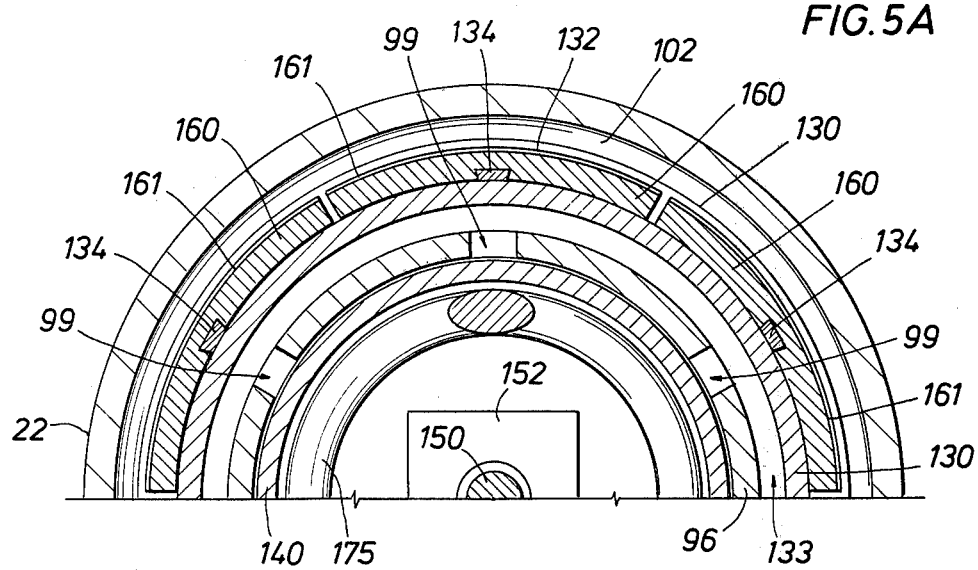
FIG. 5A is a cross-sectional view of the single module pipe plugging apparatus of FIG. 4, taken along lines 5A—5A of FIG. 4.
Figure 5B:
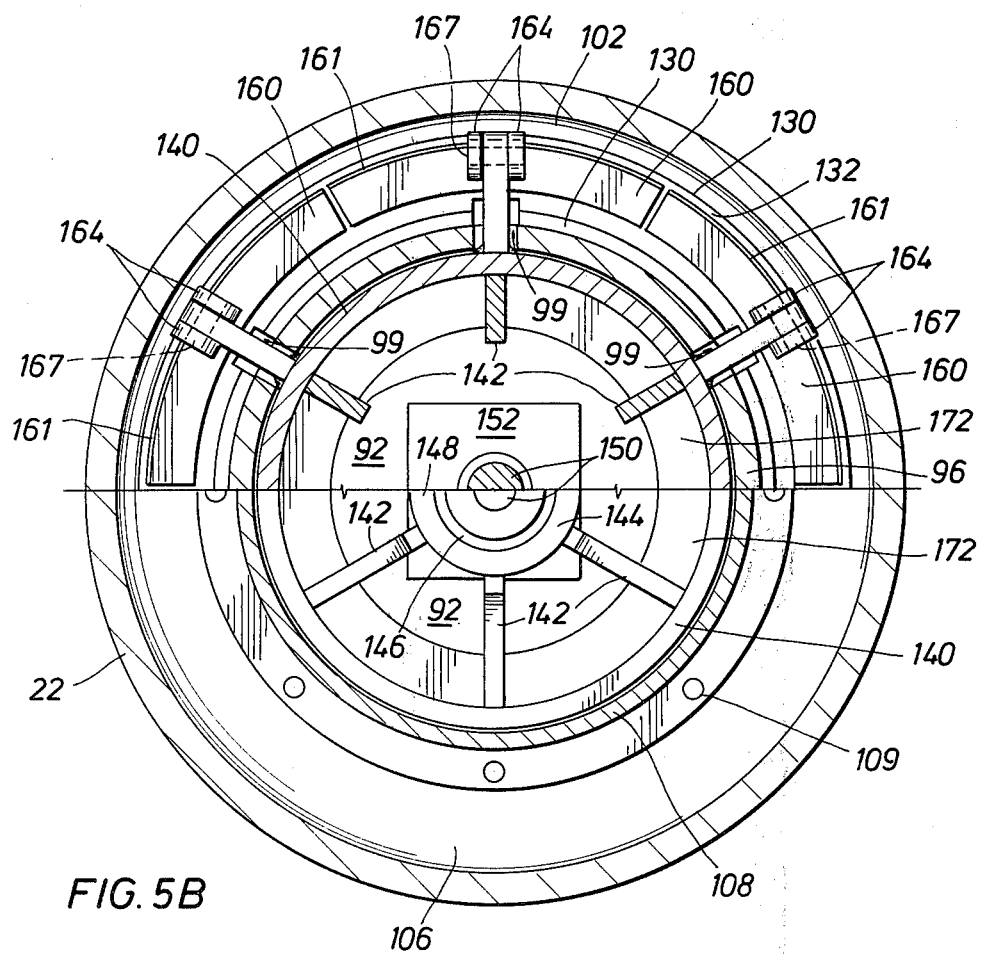
FIG. 5B is a cross-sectional view of the single module pipe plugging apparatus of FIG. 4, taken along the lines 5B—5B of FIG. 4.

Referring now to FIGS. 4, 5A and 5B, the single module plugging apparatus 20 of the present invention will be described with relation to its condition after it has been properly positioned within the pipeline 22 (or plugging apparatus 20' has been properly positioned within pipe 22') and immediately prior to the setting or plugging operation. Plug 20 includes a structural body means 90 including a pressure head 92 having radially extending shoulders 94, and which has a projected area, hereinafter referred to as the "pressure head area," shown generally at A—A. A collar 100 projects upstream from head 92 and terminates in an annular flange 101. A pigging disc 102 is attached to flange 101 by means of a retainer ring 104 and a plurality of conventional fasteners such as bolts 105. The pigging disc 102 is preferably of an elastomeric material such as neoprene or polyurethane to permit the disc to deform and compress slightly within pipeline 22, as shown, for purposes of sealing against the pipeline wall to permit the pigging fluid pressure applied to apparatus 20 to propel the device through the pipeline. An annular opening 120 is provided for permitting access to head 92 and to permit upstream fluid pressure to be applied directly to the surface 122 of pressure head 92.

Concentrically projecting from plate 92 is a cylindrical body member 96 which terminates in a ring 98 adjacent the extreme end of body cylinder 96. An annular closure ring 103 mounts over the end of body cylinder 96 and abuts ring 98. A second pigging disc 106 is attached to body cylinder 96 by means of a cylindrical body closure cap 108 which is attached through disc 106 to rings 98 and 103 by means of conventional fasteners such as bolts 109. Cylindrical body member 96 and closure cap 108 combine to form a structural body means 90 for plug 20. The pair of pigging discs 102 and 106 attached to the body means 90 form a support means to support the plugging apparatus 20 axially within pipeline 22 during movement within the pipeline and during the locking and unlocking of the plug.

The closure cap member 108, hereinabove previously mentioned, further includes a central annular plate portion 116 having mounted thereon the structural eye connector 36. Access openings 117 are provided in the surface of annular plate 116 and are closed and sealed by means of closure plates 118 which are attached to annular plate 116 by means of conventional fasteners such as bolts 119.

Disposed within body cylinder 96 is a pressurized fluid actuating means generally designated at 139. A cylindrical actuating sleeve 140 is disposed within the interior of body cylinder 96 and sized to permit sliding axial movement of sleeve 140 with respect to the interior of body cylinder 96. Sleeve 140 has disposed therein a spider assembly comprising a smaller diameter tube 144 that is axially supported within sleeve 140 by means of a plurality of radially mounted plates or gussets 142. The upstream edges of the plates or gussets 142 terminate against an interior annular ring 172 mounted within the interior of sleeve 140. A helical compression spring 175 is disposed axially within body member 96 and sleeve 140 between the inner surface of head 92 and the annular ring 172 for purposes to be hereinafter further described.

A pressurized fluid actuating cylinder 152 is axially mounted on annular head 92 within body cylinder 96 by means of bolts 155 securing the cylinder base plate 156. The cylinder actuating rod 150 projects axially into sleeve 140 and is threadably connected to a retaining spindle 148. Spindle 148 is mounted within tube 144 by means of mating flanges 146.

A plurality of longitudinal slots 99 are provided in body cylinder 96 and pass through segmented ring 98, and are radially spaced about the circumference of the cylinder. A plurality of slip mounting gussets 166 are welded to the outer surface of sleeve 140 and project radially outward through corresponding slots 99. The plurality of slip mounting gussets 166 projecting through the slots 99 in body cylinder 96 act as a guide means for permitting relative axial movement of cylinder 96 with respect to sleeve 140, but prevent relative rotational motion.

A circular wear ring 170 connects the extending ends of the slip mounting gussets 166. Also attached to the extending end of each gusset 166 are a pair of links 164 hingedly mounted by means of a hinge pin 167. The other end of each link 164 is hingedly connected by means of a hinge pin 169 to one end of a wedge-shaped slip 160. Slips 160 are supported on the outer inclined surface 132 of a frusto-conical slip support member or bowl 130 which is mounted concentrically about the outer surface of the body cylinder 96.

Slip support member 130 is not attached to the outer surface of cylinder 96 and is adapted for limited axial sliding movement with respect thereto. A plurality of longitudinal slots 135 pass through the slip support member 130 and are radially spaced to correspond to the slots 99 in the body cylinder 96. The outer inclined surface 132 of the frusto-conical slip support member 130 carries a projecting dovetail guide 134 which mates with a similar dovetail slot 162 in the bottom of each slip 160. The outer surface 132 is inclined from the smallest diameter end to its largest diameter end 136, and the lower side of slips 160 are similarly tapered. End 136 presents a shoulder spaced from pressure head shoulder 94 that precisely defines a sealing means cavity in cooperation with the pipe wall and body cylinder 96. The upper external surface 161 of slip 160 is provided with threads or other appropriate gripping surfaces for frictionally engaging the internal surface of pipe 22. The dovetail guides 134 guide the movement of slips 160 up the inclined surface 132 and cooperate with slips 160 to prevent rotational movement of slip support member 130 with respect to the outer body cylinder 96. Radially projecting pins 137 fixed to cylinder 96 project into cavity 133 in bowl 130 for purposes to be hereinafter further described.

Accordingly, it may be seen that the plugging apparatus 20 comprises three concentrically disposed cylindrical members which can move axially with respect to each other, but which are prevented from rotational movement with respect to each other. As may be seen, the plug body means 90 includes a cylindrical body member 96 with closure cap 108 and carries an outer frusto-conical slip support bowl 130 adapted for limited axial sliding movement with respect thereto. The body means 90 further cooperates with an actuating sleeve 140 for limited movement thereof within body member 96.

The relatively large diameter of the concentric cylinders 96 and 140 cooperate to provide a high degree of bending rigidity to resist outside bending forces as the plugging apparatus moves through the pipeline, particularly where negotiating bends bends in the pipe. Further, the relatively long engagement length of concentric cylinders 96 and 140 prevents cocking of the cylinders with respect to each other during actuation.

Figure 7:
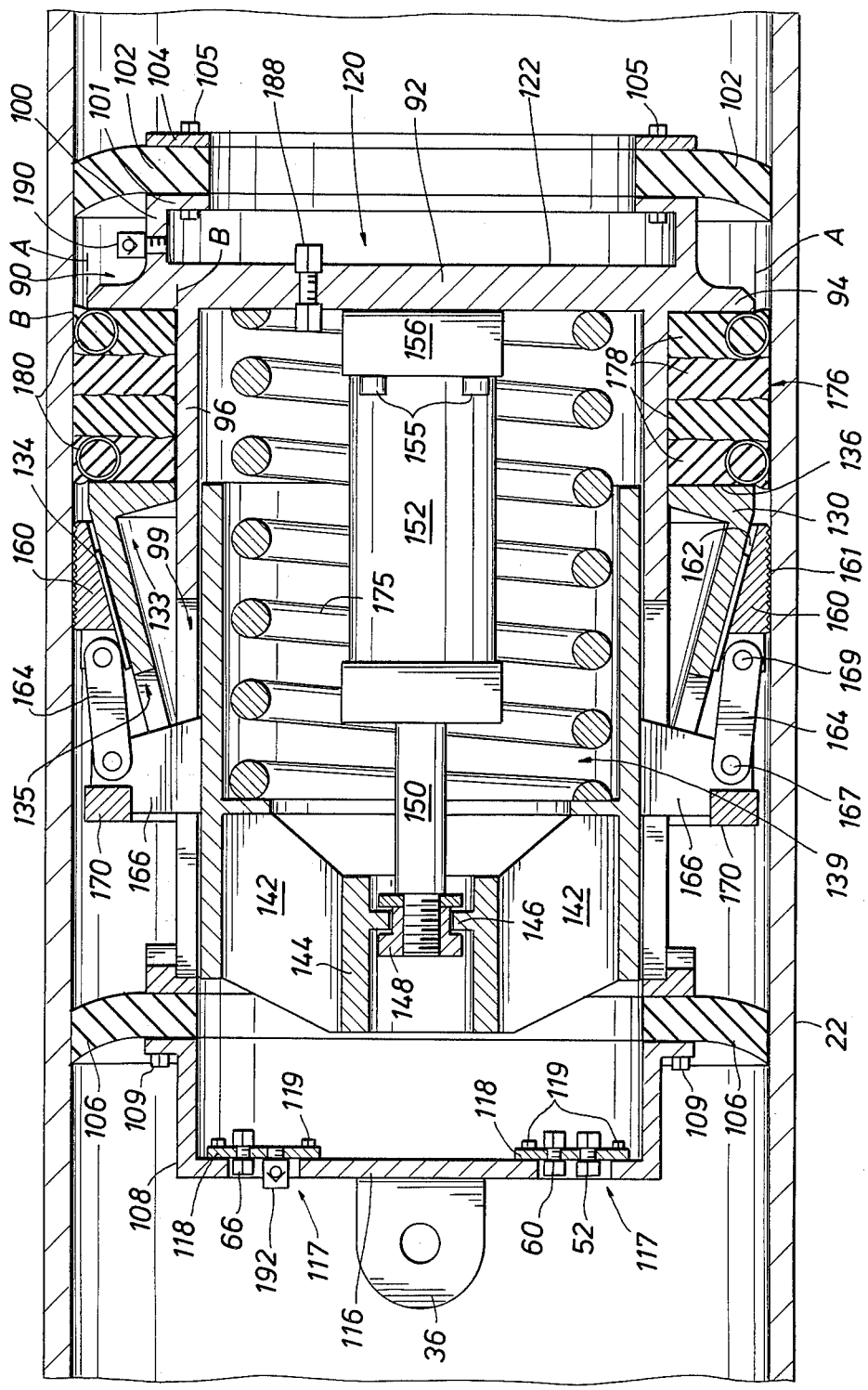
FIG. 7 is a vertical cross-section of the single module pipe plugging apparatus shown supported in the pipeline in its locked and sealing position.

Disposed between pressure head shoulder 94 and the shoulder 136 of the slip support member 130 is a compression seal means shown generally at 176. Compression seal means 176 is formed of a plurality of annular packing seals 178 having a selected annular area shown at B—B (FIG. 7). At least the outer annular packing seals 178 may have disposed therein anti-extrusion rings or springs 180. The annular packing seal members 178 are made of any suitable compressive elastomeric material such as an acrylo-nitrile elastomer.

Disposed in closure cap 108 is a check valve 192 communicating with the interior of the body means 90, while collar 100 carries a check valve 190 that provides fluid communication between the forward end of plug 20 (the opening or cavity 120) and the outer annular space between the plug and the inner surface of pipe 22. During the pigging operation pressurized pigging fluid applied against closure cap 108 and pigging disc 106 will be permitted to flow through check valve 192 into the interior of body means 90. The pressurized fluid will then escape through slots 99 into the annular space surrounding the plug 20 downstream from pigging disc 102 but will not be permitted further passage by the closure of check valve 190.

Accordingly, pigging pressure will be applied to both pigging discs 102 and 106 with pigging fluid filling the interior of plug 20. If the plug 20 is later pigged in the reverse direction to recapture the plug after plugging operations are completed, pressurized pigging fluid will be applied against the surfaces of disc 102 and head 92, and transmitted through open check valve 190 into the annular space between discs 102 and 106. However, fluid flow into the interior of plug 20 through slots 99 in body cylinder 96 will be stopped by the now closed check valve 192, permitting pigging pressure to be applied to both pigging discs 102 and 106.

Referring now to FIG. 6, a simplified internal hydraulic schematic of the plugging apparatus 20 is shown. The hydraulic cylinder 152 has a piston 154 to which is mounted the cylinder actuating rod 150, as hereinabove described. The hydraulic "locking" supply line is connected through connector 52 and hydraulic line 185 to an inlet connector 184 for retracting cylinder actuating rod 150 and locking the slips 160 and setting the seal 176 (see FIG. 4) as will be hereinafter further described. In addition, the "unlocking" hydraulic line is connected through connector 60 and line 187 to an inlet connector 186 on the other side of piston 154 for extending the hydraulic cylinder rod 150. Similarly, a connector 188 is mounted in the upstream pressure head for admitting pressurized fluid, and is connected by hydraulic line 189 to connector 66 for monitoring the fluid pressure as hereinabove earlier described. Connectors 52, 60 and 66 are mounted in closure cap 108 (see FIG. 4). The hydraulic fluid cylinder 152 has been sized and cooperates with the pressurized fluid supply means 42 (FIG. 2) to provide a predetermined accurately controlled actuating pressure to plug 20 for purposes to be hereinafter further explained.

Referring now to FIGS. 4, 5A, 5B, 6 and 7, the operation of plugging apparatus 20 to its locked and sealed position will be described. When plugging apparatus 20 has been located in its proper position within pipeline 22, pressurized fluid is applied through "locking" line connector 52 to hydraulic cylinder 152, thus actuating piston 154. As rod 150 is retracted into cylinder 152, the actuating sleeve 140 is moved axially with respect to the body cylinder 96, thus driving slip mounting gussets 166 forward through slots 99 and 135, and moving slips 160 up the inclined surface of slip support member 130 until the slips 160 wedge into engagement with the inner surface of pipe 22. Further actuating force supplied by cylinder 152 causes the free-floating slip support member 130 to be driven by the axial forces exerted thereon by the wedged slip 160, thereby applying an axial compression force through slip support shoulder 136 to squeeze and compress the plurality of packer seal members 178 against pressure head shoulder 94.

As the cylinder 152 continues to provide a driving force to slips 160 and slip support member 130, a predetermined axial force (dependent on the geometry of the slips 160 and slip support bowl 130) continues to be applied to annular compression sealing rings 178. The compression seals 178 radially expand in response to such axial compression force for sealingly engaging the inside surface of the pipe 22. Thus the axial compression forces exerted against seals 178 are converted into radial forces within seals 178 in a predetermined relationship to apply a known radial sealing pressure to the wall of pipe 22. Similarly, the axial forces exerted against slips 160 and slip support bowl 130 by the actuating means 139 are converted into radial forces (due to the geometry of slips 160 and bowl 130) to apply a known radial locking pressure to the wall of pipe 22 in a predetermined relationship to effect positive locking engagement with pipe 22.

In this position, with the sealing means 176 radially expanded to seal against the inner surface of pipeline 22, and slips 160 locked to the wall of pipe 22, the plugging device 20 has formed a fixed fluidtight seal and fluid pressure to the rear of the plugging device can now be lowered to permit work and entry within pipe 22. As the pipeline fluid pressure to the rear of plug 20 is lowered, the differential pressure across the plugging apparatus 20 increases due to the constant pressure of the pipeline fluid forward of the pressure head 92. The differential pressure acting against the projected surface area of the pressure head 92 is applied as an axial force through shoulder 94 to the sealing means 176 and to the slip support member 130. This force applied to the slip support member 130 causes the member to wedge against slips 160 which are forced with greater radial outward pressure against the inner walls of pipe 22 for enhancing locking engagement with pipe 22.

Further, this force axially transmitted through shoulder 94 to sealing means 176 is converted into radial forces which further radially expand the annular packing seals 178 to increase the radial sealing pressure against the inner surface of pipeline 22, thus enhancing the sealing pressure as the differential pressure increases. In addition, the anti-extrusion rings 180 function to prevent the outer packing seals 178 from extruding past compression shoulder 94 and 136 into the annulus. Thus the anti-extrusion rings 180 function to preserve the sealing means cavity hereinabove described which is important in maintaining a proper radial seal against pipe 22 at high axial compression forces.

This ability of the differential pressure to enhance the locking and sealing pressures exerted against the inner wall of pipeline 22 is known as "self-energizing." The actuating forces exerted by the plug actuating means 139 can be lowered or deenergized as the differential pressure across the plug 20 increases until the actuating means 139 is completely de-energized, and the "self-energizing" ability of the plug 20 will maintain the plug in a locked and sealed position within the pipe during subsequent work or repair operations. This is a major advantage since, once the hydraulic actuating means 139 has set slips 160 and seals 178, the self-energizing ability of plug 20 will maintain the plugged and sealed condition even if the hydraulic system fails.

However, because plug 20 will generally be utilized in a situation where the differential pressure across the plug, when in the locked and sealed condition, may equal or exceed the designed working fluid pressure for the pipe, it is critical to control the radial pressures exerted by the locking slips 160 and the compression seal means 176 in order to prevent overstressing the pipe beyond its designed yield strength. This is important, since the typical "working" and "testing" pressures for a pipeline are generally in the range of 60% and 90% of the yield strength of the pipe, respectively, and it is often necessary to plug a pipeline 22 with radial locking and sealing pressures approaching but not exceeding the yield strength of the pipe.

Accordingly, it is critical that the radial sealing pressure be controlled within known limits and such radial sealing pressures for compression seals 178 can be expressed as follows:

$$P_s = (k) \frac{A_{H92}}{A_{S178}} P_u \quad (1)$$

where:
$P_s$ = radial sealing pressure exerted by seals 178;

$A_{H92}$ = projected area of the pressure head 92 including radial shoulder 94;
$A_{S178}$ = cross-sectional area of expanded compression seal 178 between the pipe 22 and body cylinder 96;
$P_u$ = annular pressure acting on the projected surface area It can now be seen that the plug 20 can be designed to control the radial sealing pressure exerted by seal means 176 in response to known differential pressures exerted by the fluid in the pipeline by a predetermined selection of the areas represented by the terms $A_{H92}$ and $A_{S178}$ in equation (1) above. It has been found that plug 20 will be "self-energizing" at a ratio of $A_{H92}/A_{S178}$ at least as low as 1.3, but higher ratios are desired to effect an enhanced seal if the yield strength of the pipe will permit. Thus, the known differential pressure acting on the projected area of head 92 can be transmitted as an axial force applied to compression seals 178 for conversion to radial compression forces in seals 178 for application as a predetermined radial sealing pressure to pipeline 22.

When it is desirable to unlock the plugging apparatus 20 from pipeline 22, pressure can be equalized on each side of plug 20 and hydraulic pressure applied through the "unlocking" line to connector 60 and to the interior of cylinder 152 to extend piston rod 150. The extension of piston rod 150 moves the actuating sleeve 140 toward the body closure cap 108 and applies an unlocking force to slips 160 to move the slips from locking engagement with the inner surface of pipeline 22 and release the compression forces applied to sealing means 176 for breaking the plugging seal with the inner surface of the pipeline. The positive force exerted by the extension of piston rod 150 is sufficient to break the frictional securing forces between slips 160 and pipeline 22, however, the action of the compressed helical spring 175 enhances this "unlocking" force by applying an unlocking force to the annular ring 172 to drive sleeve 140 toward closure cap 108.

In addition, in the event of a failure in the hydraulic system which prevents the extension of cylinder rod 150, then as the differential pressure is equalized across the plugging apparatus 20 the compressed spring 175 and elastomeric packing seals 178 cooperate to exert sufficient "unlocking" force against the annular ring 172 to drive the actuating sleeve 140 to its unlocked position, thereby unseating and disengaging slips 160 and releases compression forces on seals 178.

In the event that the extension of cylinder rod 150 or the force applied by compression spring 175 fails to unseat slips 160, then a pigging pressure can be applied to the rear end of plugging apparatus 20 to exert an axial force against the body means 90. Such force will cause cylinder 96 to move with respect to actuating sleeve 140 and slips 160, and release the compression forces on the compression sealing means 176. Further travel of body cylinder 96 with respect to slip support member 130 will cause pins 137 to engage bowl 130 for disengaging from slips 160.

Figure 8:
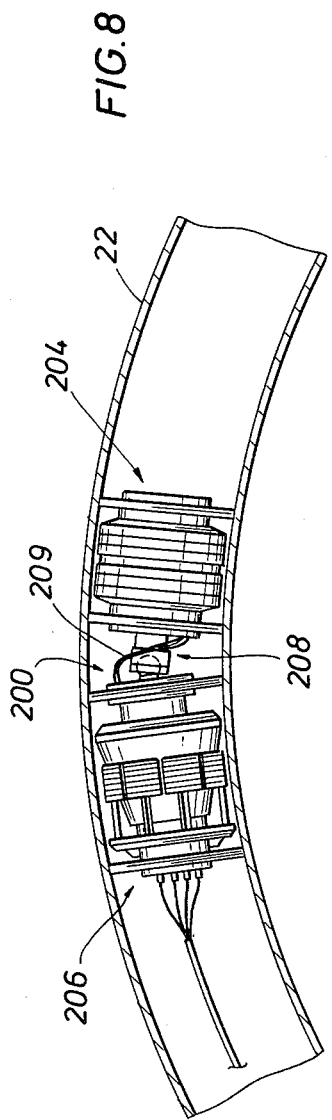
FIG. 8 is a top plan view of a pipeline partially broken away and showing the dual module articulated pipeline plugging apparatus according to this invention.

There are applications in which the single module plugging apparatus 20 can not traverse the shorter radius bends in a pipeline. Accordingly, a third embodiment of the pipeline plugging device according to this invention is also disclosed. In FIG. 8 a dual module articulated pipeline plugging apparatus 200 is shown traversing a bend in pipeline 22. The plugging apparatus 200 is comprised of a sealing module 204 and a locking module 206 that are mechanically connected together by an articulated connection 208 and an interconnecting pressurized fluid cable bundle 209. The dual module plugging apparatus 200 would be loaded and inserted into the pipeline 22 through a pig launcher (not shown) identical to the pig launching apparatus hereinabove described in connection with FIG. 1.

Figure 9:
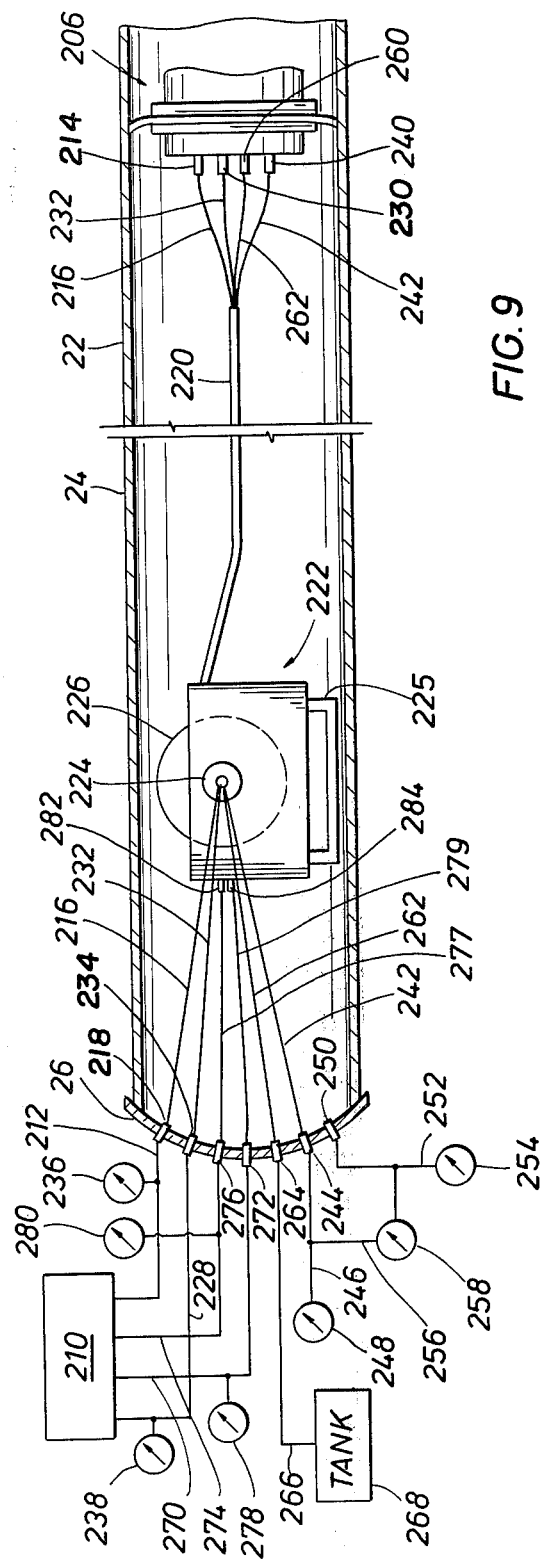
FIG. 9 is a fragmentary view of a pipeline pig launching apparatus, similar to that shown in FIG. 1, and including a simplified hydraulic schematic and connection diagram for operating the apparatus shown in FIG. 8.

FIG. 9 discloses a pressurized actuating fluid control system for the dual module plugging apparatus 200. The rear end of the locking module 206 is shown positioned within pipeline 22 while the pressurized actuating fluid supply and control system is shown schematically outside of the access door 26 of a conventional pig launcher 24. The locking module 206 may be connected to the access door 26 by means of a steel tether cable similar to that described above in connection with the single module apparatus 20 as shown in FIG. 2. In the embodiment shown in FIG. 9, the locking module 206 is connected via a hydraulic cable 220 to a hydraulic winch mechanism 222, the cable bundle 220 including a steel tether cable that may be attached to locking module 206 for limiting the movement of the module.

However, it is also to be understood that other positioning means may be used in which magnetic, radioactive or acoustical detection means are carried with the dual module plugging apparatus 200 and can be monitored externally during the pigging operation and the plug stopped at any desired location.

An external source of hydraulic or pneumatic power is utilized to control the dual module plugging apparatus 200. The preferred embodiment shown in the following figures, however, will be described with respect to use of a hydraulic fluid control system. A hydraulic power supply 210, capable of producing up to 5000 p.s.i. or the like, is shown connected by hydraulic line 212 to a hydraulic connector 218 mounted in access door 26. Line 212 and connector 218 supply hydraulic fluid to "lock" plugging apparatus 200 as will be hereinafter described in greater detail. Connector 218 is connected to a hydraulic hose winch means 222. Winch means 222 includes a frame and base 225 upon which is mounted a winch drum 226 having a hub 224 for receiving hose whips from the connectors in access door 26 for purposes of connection to the bundled cable 220 which is stored on drum 226. Line 216, passing through hose bundle 220, is connected to a hydraulic connector 214 mounted in the rear end of locking module 206 and provides hydraulic fluid internally to the actuating means of the slip module 206 and the sealing module 204 to lock or set the dual module plugging apparatus.

The hydraulic power supply 210 is also connected through a hydraulic line 228 to a connector 234 mounted in access door 26. Connector 234 and line 228 provide hydraulic fluid to "unlock" the dual module plugging apparatus 200 as will be hereinafter described in greater detail. Connector 230 is in turn connected by hydraulic line 232 to the hub 224 of the hose winch apparatus 222. Line 232 passes through cable bundle 220 and is connected to a connector 230 mounted in the rear end of locking module 206 and is for connection to the actuating means in the locking module 206 and the sealing module 204 for unlocking or unplugging apparatus 200.

The "lock" line 212 may be provided with a pressure gauge 236 to monitor fluid pressure within the line. Similarly, the "unlock" line 228 may be provided with a suitable pressure gauge 238 for monitoring the fluid pressure therein. A hydraulic connector 250 is mounted in access door 26 and is connected through line 252 to a pressure gauge 254 for monitoring the pigging pressure in pipeline 22 while the plugging apparatus 200 is being positioned to a desired location.

Generally, it is desirable to also have means for detecting the fluid pressure on the high pressure side of plugging apparatus 200. Accordingly, there is provided a connector 240, shown mounted in the rear end of locking module 206, which is connected by hydraulic line 242 and cable bundle 220 to a connector 244 mounted in access door 26. The connector 240 mounted on locking module 206 is connected to a means for sensing the pressure on the high pressure end of the sealing module 204 as will be hereinafter further described. Hydraulic connector 244 is then connected through a hydraulic line 246 to a pressure gauge 248 for monitoring the fluid pressure ahead of the sealing module 204. Further, a pressure gauge 258 could be mounted in hydraulic line 256 connected between hydraulic lines 252 and 246 for purposes of reading the differential pressure across the dual module plugging apparatus 200.

In addition, a hydraulic connector 260 is mounted in the rear end of locking module 206 and connected through line 262 and cable bundle 220 to a hydraulic connector 264 mounted in the access door 26. Connector 264 is then connected to an external receiving tank 268 through a line 266 for receiving pressurized line fluid that may leak past part of the sealing means in the sealing module 204 as will be hereinafter further described. Hydraulic supply 210 is also connected to the hose winch means 222 through conduits comprising lines 270 and 274, connectors 272 and 276, lines 277 and 279 and connectors 282 and 284, respectively, for controlling the operation of the cable drum 226. The hydraulic cable winch means 222 is used to control the amount of payout of cable 220 during pigging movement of the dual module plugging apparatus 200. Lines 270 and 274 may be provided with pressure gauges 278 and 280, respectively, to monitor fluid pressure within the lines.

Figure 10:
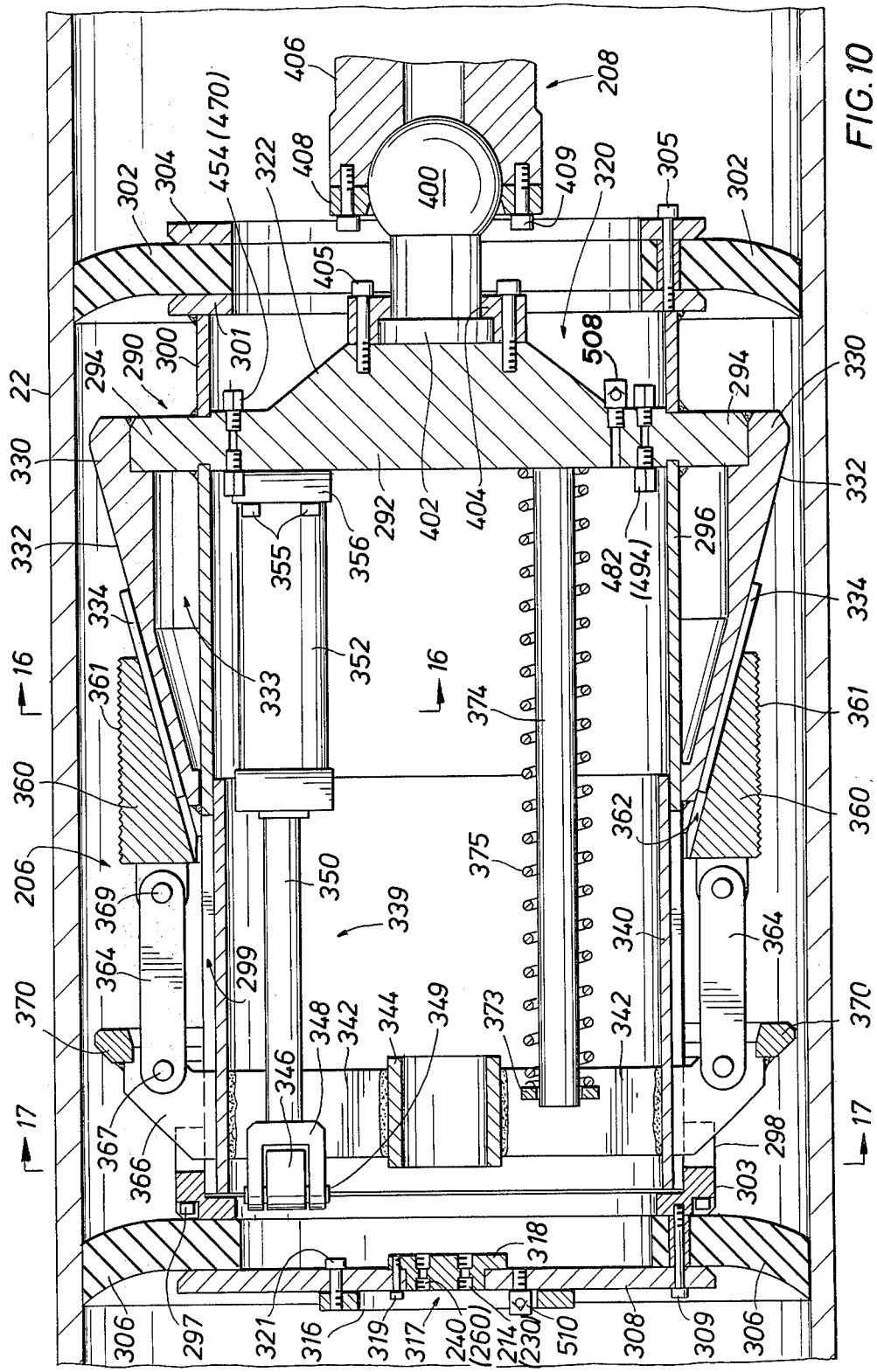
FIG. 10 is a vertical cross-section of the slip module according to this invention and shown supported in a pipeline in its unlocked position.
Figure 16:
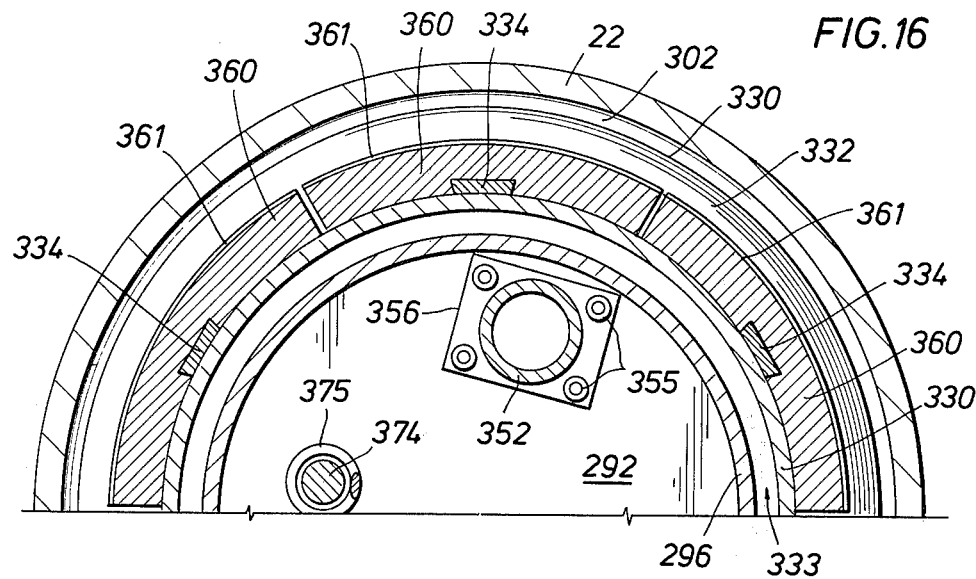
FIG. 16 is a cross-sectional view of the slip module of FIG. 10, taken along lines 16—16 of FIG. 10.
Figure 17:
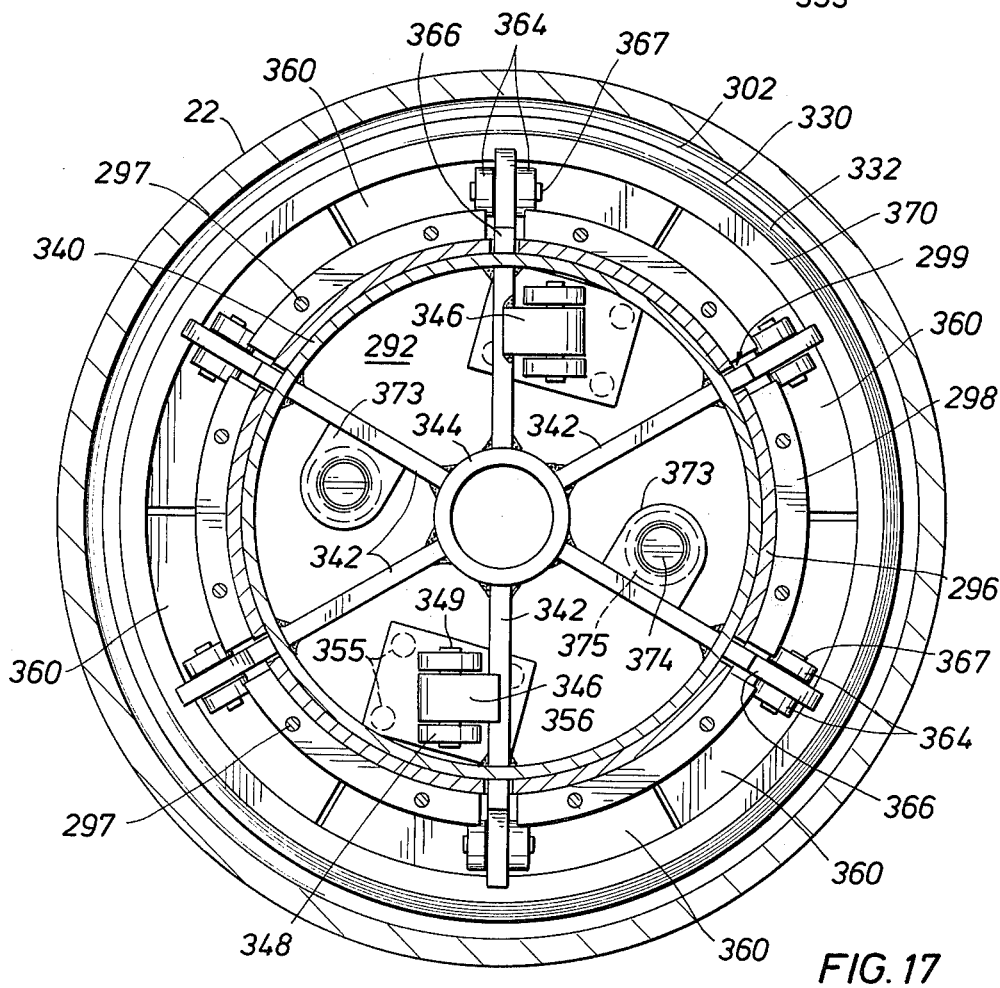
FIG. 17 is a cross-sectional view of the slip module of FIG. 10, taken along lines 17—17 of FIG. 10.

Referring now to FIGS. 10, 16 and 17, the slip module 206 of the dual module plugging apparatus 200 according to the present invention will be described with relation to its condition after it has been properly positioned within the pipeline 22 and immediately prior to the setting or plugging operation. Locking module 206 includes a structural body means 290 including a pressure head 292, having a projected area, hereinafter referred to as the "pressure head area", and a forward surface 322. A collar 300 is concentrically mounted on head 292 and projects therefrom and terminates in an annular ring 301 welded to the collar 300.

A pigging disc 302 is attached to the ring 301 by means of an external retainer ring 304 and a plurality of conventional fasteners such as bolts 305. The pigging disc 302 is preferably of an elastomeric material such as neoprene or polyurethane to permit the disc to deform and compress slightly within pipeline 22, as shown, for purposes of sealing against the pipeline wall to permit the pigging fluid pressure applied to locking module 206 to propel the module through the pipeline. An annular opening 320 is provided for permitting access to plate 292 and the mounting of the articulating means ball 400.

Concentrically projecting from head 292 is a cylindrical body member 296 which terminates in a segmented ring 298 adjacent to the extreme end of body cylinder 296. An annular closure ring 303 mounts over the end of body cylinder 296 and is attached to segmented ring 298 by means of a plurality of conventional fasteners such as bolts 297. A second pigging disc 306 is attached to body cylinder 296 by means of an annular body closure plate 308 which is attached through disc 306 to rings 298 and 303 by means of conventional fasteners such as bolts 309. The cylindrical body member 296 and closure plate 308 combine to form a structural body means 290 for module 206. The pair of pigging discs 302 and 306 attach to the body means 290 to form a support means to support module 206 axially within pipeline 22 during movement within the pipeline and during the locking and unlocking of the module.

The closure plate 308, hereinabove previously mentioned, further includes a centrally mounted external ring 316 connected to plate 308 by means of bolts 321. An access opening 317 is provided in the surface of annular plate 308 and is closed and sealed by means of a closure plug 318 which is attached to plate 308 by means of conventional fasteners such as bolts 319. Disposed in the closure plug 318 are hydraulic connectors 240, 260, 214, and 230 for connection to the external hydraulic cable bundle 220 (see FIG. 9). In addition, a check valve 510 is disposed in plate 308 to perform the identical function to check valve 192, hereinabove described with regard to the single module plugging apparatus 20.

Disposed within body cylinder 296 is a pressurized fluid actuating means generally designated as 339. A cylindrical actuating sleeve 340 is disposed in the interior of body cylinder 296 and sized to permit sliding axial movement of sleeve 340 with respect to the interior of body cylinder 296. Sleeve 340 has disposed therein and adjacent to one end a spider assembly comprising a smaller diameter tube 344 that is axially supported within tube 340 by means of a plurality of radially mounted plates or gussets 342.

A pair of hydraulic cylinders 352 (only one hydraulic cylinder is shown in the drawing for simplicity) are mounted parallel to the axis of slip module 206 and are attached to head 292 within body cylinder 296 by means of bolts 355 securing the cylinder base plate 356. The cylinder actuating rod 350 projects axially into sleeve 340 and terminates in a clevis 348. Clevis 348 is connected by means of a clevis pin 349 to a clevis bracket 346 mounted on a gusset 342. Similarly, a pair of guide rods 374 are provided within body means 290 and are welded to head 292 in a spaced relationship parallel to the axis of slip module 206 (only one guide rod is shown for simplicity). The other end of guide rod 374 is supported by a guide rod bracket 373 mounted on a gusset 342. A helical compression spring 375 is concentrically disposed about guide rod 374 and contacts the inner surface of pressure head 292 and the guide rod bracket 373 for purposes that will be hereinafter further described.

A plurality of longitudinal slots 299 are provided in body cylinder 296 and through segmented ring 298, and are radially spaced about the circumference of the cylinder. A plurality of slip mounting gussets 366 are welded to the outer surface of sleeve 340 and project radially outward through corresponding slots 299. The plurality of slip mounting gussets 366 projecting through the slots 299 in body cylinder 296 act as guide means for permitting relative axial movement of cylinder 296 with respect to sleeve 340 but prevent relative rotational motion therebetween.

A circular wear ring 370 connects the extending ends of the slip mounting gussets 366. Also attached to the extending end of each gusset 366 are a pair of links 364 hingedly mounted by means of a hinge pin 367. The other end of links 364 are hingedly connected by means of a hinge pin 369 to one end of a wedge-shaped slip 360. Slips 360 are supported on the outer inclined surface 332 of a frusto-conical slip support member or bowl 330 which is mounted concentrically about the outer surface of the body cylinder 296.

The slip support member 330 is attached to the outer surface of cylinder 296 by any suitable means such as welding or brazing with the forward end attached to the radial shoulder 294 of head 292. The outer inclined surface 332 of the frusto-conical slip support member 330 carries a projecting dovetail guide 334 which mates with a similar dovetail slot 362 in the bottom of each slip 360. An annular cavity 333 is formed between the slip support member 330 and the body cylinder 296. The outer surface 332 is inclined from the smallest diameter end to its largest diameter end that terminates against radial shoulder 294, and the lower side of slips 360 are similarly tapered. The outer external surfaces 361 of slips 360 are provided with threads or other appropriate gripping surfaces for frictionally engaging the internal surface of pipe 22. The dovetail guides 334 guide the movement of slips 360 up the inclined surfaces of 332 of the slip support member 330.

Accordingly, it may be seen that module 206 includes two concentrically disposed cylindrical members which can move axially with respect to each other but which are prevented from relative rotational movement. As may be seen, the body means 290 includes a cylindrical member 296 with a closure plate 308 and is adapted for cooperating with an actuating sleeve 340 for permitting limited axial movement thereof within body member 296. A third concentric cylindrical member, slip support member 330, is attached to the outer surface of body cylinder 296.

The relatively large diameter of the concentric cylinders 296 and 340 cooperate to provide a high degree of bending rigidity to resist outside bending forces as the module moves through the pipeline, particularly when negotiating bends in the pipe. Further, the relatively long engagement length of concentric cylinders 296 and 340 prevents cocking of the cylinders with respect to each other during actuation.

Projecting axially from pressure head 292 is a ball 400 having a base flange 402 that is mounted to the external surface 322 of head 292 by means of a mounting ring 404 and bolts 405. Ball 400 is part of the articulated connection means 208 for structurally connecting modules 204 and 206.

Also disposed in plate 292 are hydraulic connectors 454, 470, 482 and 494 for purposes to be hereinafter further described. In addition, a check valve 506 is disposed in pressure head 292 for purposes identical to the operation of check valve 190 during the pigging operation as hereinabove described with regard to the single module plug 20.

Referring now to FIG. 11, the sealing module 204 of the dual module plugging apparatus 200 according to the present invention will be described with relation to its condition after it has been properly positioned within the pipeline 22, along with the locking module 206, immediately prior to the setting or plugging operation. Sealing module 204 includes a body means comprising a first cylindrical body member 410 closed at one end and having a projecting cylindrical portion 411. The outer end of cylinder 411 terminates in a radially extending flange 412 presenting a shoulder 413. The sealing module 204 body means further includes a second cylindrical body member 420 closed at one end and having a projecting cylindrical portion 419, the outer end of which terminates in a radially extending flange 422 presenting a shoulder 423. The body cylinder 420 includes head 421, hereinafter referred to as the "pressure head", having a projected area hereinafter referred to as the "pressure head area" shown at A—A.

The body cylinders 410 and 420, respectively, are spaced in an opposed relationship and supported in an axial relationship by means of a concentrically disposed cylinder or sleeve 430 that slidingly engages the inner surfaces of the cylindrical portions 411 and 421 of body members 410 and 420, respectively. Disposed between the shoulders 413 and 423 of flanges 412 and 422 respectively, is a compression seal means 376 circumferentially mounted on sleeve 430. Compression seal means 376 may preferably be formed of a plurality of annular packing seals 378 that are circumferentially mounted on sleeve 430 and disposed between shoulders 413 and 423 of flanges 412 and 422, respectively. The annular packing seal members 378 are made of any suitable compressive elastomeric material such as an acrylonitrile elastomer. Packing seal members 378 have a selected annular area shown at B—B.

As shown in FIG. 11, the compression sealing means 376 may be split into a forward sealing means 376a and a rear sealing means 376b separated by a metal spacer 431 attached to sleeve 430. The spacer 431 has disposed about its periphery an annular channel 435 which is connected by a bore 433 through the annular spacer 431 to a similar registering bore through sleeve 430 to a pressurized fluid connector 502 for purposes to be hereinafter further described. At least the outer annular packing seals 378 adjacent the flanges 412 and 422 and the annular spacer 431 may have disposed therein antiextrusion rings or springs 380. The spaced shoulders 413 and 423 of flanges 412 and 422 of body cylinder members 410 and 420, respectively, precisely define a sealing means cavity in cooperation with the pipe wall and sleeve 430. If the sealing means 376 is split as shown at 376a and 376b, then the shoulders cooperate with spacer 431, the pipe wall and sleeve 430 to precisely define a sealing means cavity.

A pigging disc 424 is attached to the annular shoulder portion 425 of body cylinder 420 by means of retainer plate 426 and a plurality of conventional fasteners such as bolts 427. Similarly, a second pigging disc 414 is attached to the body cylinder 410 by means of a mounting ring 416 which is attached through disc 414 to a shoulder 415 disposed in body cylinder 410 by means of conventional fasteners such as bolts 417. The pigging discs 414 and 424 are preferably of an elastomeric material such as neoprene and polyurethane to permit the discs to deform and compress slightly within pipeline 22, as shown, for purposes of sealing against the pipeline wall to permit the pigging fluid pressure applied to sealing module 204 to propel the module through the pipeline. In addition, the pair of pigging discs 414 and 424 form support means to support the sealing module 204 axially within pipeline 22 during movement within the pipeline and during the sealing and unsealing operation of the module.

Axially projecting from the body cylinder 410 is a socket member 406 that has disposed therein a ball-shaped cavity 407 for accepting the ball member 400 projecting forwardly from the locking module 206. Socket member 406 is attached to body cylinder 410 by means of an axially disposed threaded shaft or rod 442 that has threaded ends projecting forwardly and rearwardly from body member 410. The ball 400 is retained within the cavity 407 of socket 406 by means of a retainer flange 408 attached to socket 406 by means of bolts 409. The socket 406 and ball 400 cooperate to form an axial load transferring articulated means 208 for connecting the slip and sealing modules together in tandem to form the dual-module plugging apparatus 200. Means 208 permits bending movement and axial deflection of modules 204 and 206 with respect to each other.

The other end of threaded shaft 442 projects into the interior of sealing module 204 and is threadably attached to an actuating rod 440 of a suitable pressurized fluid cylinder, such as a hydraulic cylinder 436. Cylinder 436 is mounted axially within sealing module 204 and attached to the inner surface of the pressure head 421 by means of bolts 439 and mounting flange 438.

Hydraulic connectors 458, 474, 486 and 498 are mounted in body support cylinder 410 for accepting hydraulic hose connections from module 206 through cable bundle 209 (see FIG. 8) for controlling the actuating means 436, and for purposes to be hereinafter further described. Check valves 504 and 506 are mounted in the retainer plate 426 and the body cylinder 410, respectively, and perform functions during the pigging operation identical to the function performed by check valves 190 and 192 disposed in the single module plugging apparatus 20, and the check valves 508 and 510 disposed in the locking module 206, as hereinabove described. Check valve 506 communicates with the interior of sealing module 204 by means of bores 505 and 507, disposed in the body cylinder 410, to the annular space between pigging discs 414 and 424 for purposes hereinabove described that are necessary during the pigging operation. In addition, the annular space between pigging disc 414 and 424 also communicates to the inner cavity 428 between pressure head surface 429 and the closure plate 426 through bores 509 and 511 disposed in the pressure head 421.

Figures 12, 13:
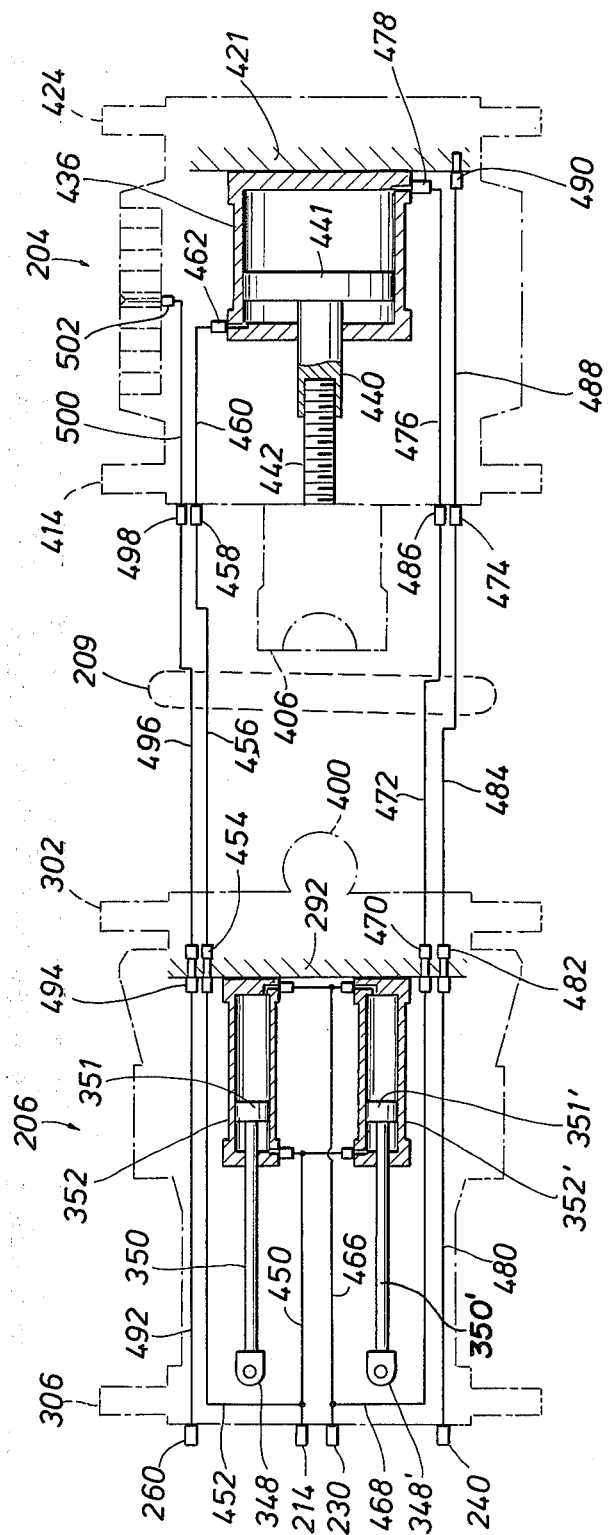
FIG. 12 is a schematic side elevation view of the slip module showing the hydraulic actuating means and an internal schematic of the hydraulic system.
FIG. 13 is a schematic side elevation view of the sealing module showing the hydraulic actuating means and an internal schematic of the hydraulic system.
Figure 15:
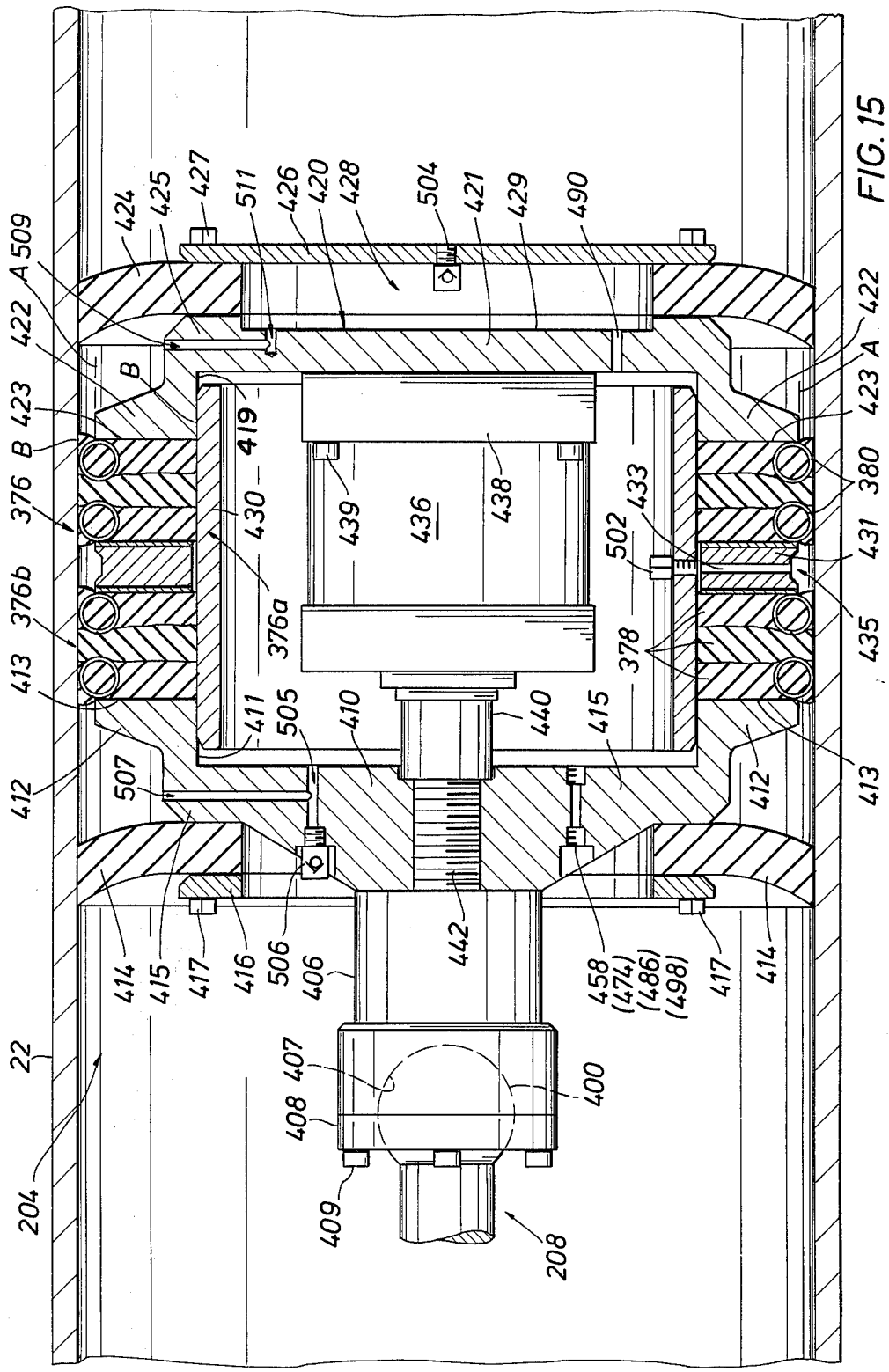
FIG. 15 is a vertical cross-section of the sealing module according to this invention shown in its set or sealing position in the pipeline.

Referring now to FIGS. 12 and 13, simplified internal hydraulic schematics of modules 204 and 206 are shown. The hydraulic cylinders 352 and 352' of module 206 have pistons 351 and 351' connected to cylinder actuating rods 350 and 350'. The hydraulic "locking" supply line from the external source is connected through connector 214 and hydraulic line 450 to respective cylinder inlet connectors in cylinders 352 and 352' for admitting hydraulic pressurized fluid for retracting cylinder actuating rods 350 and 350' and locking the slips 360, as will be hereinafter further described. In addition, the "locking" supply line 450 is also connected by means of line 452 to a connector 454 mounted in the pressure head 292.

Similarly, the "unlocking" hydraulic line is connected through connector 230 and line 466 to inlet connectors on cylinders 350 and 350' for admitting hydraulic fluid to the other side of pistons 351 and 351' for extending hydraulic cylinder rods 350 and 350'. In addition, "unlocking" line 466 is also connected by line 468 to a connector 470 mounted in the pressure head 292. Connectors 240 and 260 are provided in the rear end of module 206 and are connected by lines 480 and 492 to connectors 482 and 494, respectively mounted in the pressure head 292.

The hydraulic cylinder 436 disposed in the sealing module 204 has a piston 441 to which is mounted the cylinder actuating rod 440. The hydraulic "locking" supply is provided by a flexible hydraulic hose 456 (part of interconnecting hose bundle 209) connected between the connector 454 of the locking module 206, and a connector 458 mounted in sealing module 204 as hereinabove described. The "locking" fluid pressure is provided through connector 458 and line 460 to an input connector 462 for retracting cylinder actuating rod 440 and setting the seal means 376 as will be hereinafter further described.

Similarly, the "unlocking" supply is provided by means of a flexible hydraulic hose 472 (through hose bundle 209) connecting connector 470 disposed in the rear end of module 206 and connector 486 disposed in the end of sealing module 204 as hereinabove previously described. The hydraulic "unlocking" supply line is connected through connector 486 and line 476 to an inlet connector 478 on the other side of piston 441 for extending the hydraulic cylinder rod 440. In addition, a connector 490 is mounted in the pressure head 421 for admitting pressurized fluid, and is connected by hydraulic line 488 to connector 474. A flexible hydraulic line 484 (through hose bundle 209) interconnects connectors 474 of the sealing module 204 and connector 482 of the slip module 206 for monitoring the upstream fluid pressure as hereinabove earlier described.

The hydraulic cylinders 352 and 352′ of the slip module 206, and the hydraulic cylinder 436 of the sealing module 204 have been sized and cooperate with the pressurized fluid supply means 210 (FIG. 9) to provide a predetermined, accurately controlled actuating pressure to modules 204 and 206 for purposes to be hereinafter further explained. As previously described, a fluid connector 502 disposed in the interior of sleeve 430 and communicating with a bore 433 disposed in sealing spacer member 431 (see FIG. 11) is connected by means of a line 500 to a connector 498 disposed in the rear end of sealing module 204. A flexible hydraulic line 496 (through hose bundle 209) connects the connector 498 to the connector 494 mounted in the pressure head 292 of the slip module 206, and is provided for exhausting pressurized fluid that may leak past the forward portion of the compression sealing means 376 as will be hereinafter further described. The pressurized fluid that is exhausted through line 500 will be received and stored in tank 268 (see FIG. 9).

The operation of the dual module plugging apparatus 200, and in particular slip module 206 and sealing module 204, to the locked and sealed position will now be described in detail with reference to FIGS. 10-17. When the dual module plugging apparatus 200 has been located in its power position within pipeline 22, pressurized hydraulic fluid is applied through the "locking" line connector 214 to hydraulic cylinders 352 of slip module 206, thus retracting actuating rods 350. The actuating sleeve 340 is moved axially with respect to body cylinder 296, thus driving the slip mounting gussets 336 forward through slots 299, and moving slips 360 up the inclined surface of slip support bowl 330 until the slips 360 wedge into engagement with the inner surface of pipe 22. Further actuating force supplied by cylinders 352 cause a greater wedging action between the slip support bowl 330 and slips 360, and due to the geometry of slips 360 and bowl 330, the axial force exerted against slips 360 and slip support member 330 by the actuating means 339 are converted into radial forces in a predetermined relationship to apply a known radial locking pressure to the wall of pipe 22. As sleeve 340 is moved axially to force slips 360 into locking position, the guide rod bracket 373 slides over the guide rod 374 and compresses helical compression spring 375.

The "locking" hydraulic fluid pressure is also applied through line 452, connector 454, flexible interconnecting cable 456, connector 458, and line 460 to the inlet 462 of hydraulic cylinder 436, the actuating means of sealing module 204. The pressurized fluid retracts cylinder actuating rod 440 into the actuating cylinder 436 and pulls the opposed cylindrical body members 410 and 420 axially together by sliding movement with respect to sleeve 430. This axial movement applies an axial compression force through shoulders 413 and 423 of body support members 410 and 420, respectively, to squeeze and compress the plurality of packer seal members 378 against the centrally disposed seal spacer 431.

As the cylinder 436 continues to provide a force pulling the opposing body members 410 and 420 axially together, a predetermined axial compression force is continued to be applied to the annular compression sealing rings 378. The compression seals 378 radially expand in response to such axial compression force for sealingly engaging the inside surface of the pipe 22. Thus the axial compression forces exerted against the seals 378 are converted into radial forces within seals 378 to apply a known radial sealing pressure to the wall of pipe 22 in a predetermined ratio or relationship to affect a positive seal.

In this position, with the sealing means 376 radially expanded to seal against the inner surface of pipeline 22, and slips 360 locked to the wall of pipe 22, the plugging apparatus 200 has formed a fixed, fluid-tight seal and fluid pressure to the rear of the sealing module 204 can now be lowered to permit work and entry within pipe 22. As the pipeline fluid pressure is lowered, the differential pressure across the sealing module 204 increases due to the constant pressure of the pipeline fluid forward of pressure head 421. The differential pressure acting against the projected surface area of the pressure head 421 is applied as an axial force through shoulder 423 to the sealing means 376. In addition, this axial force is also applied through the compression seal means 376, the body cylinder 410, socket connector 406 and ball 400 to the pressure head 292 of the slip module 206. The differential pressure induced forces are then transmitted axially to the slip support member 330.

This force applied to the slip support member 330 causes the member to wedge rearwardly against slips 360 which are forced with greater radial outward pressure against the inner walls of pipe 22 for enhancing locking engagement with pipe 22. This further locking of the slip module 206 with respect to pipe 22 stablizes or anchors the position of the pressure head 292 of module 206 and the axially projecting ball 400. Due to the direct mechanical connection between ball 400 and socket 406, the body cylinder 410 of sip module 204 is held rigidly in place and restrained from movement, thus presenting a stabilized compression sealing surface at shoulder 413 of radial flange 412 for compressing the sealing means 376.

The force above described, axially transmitted through flanges 422 of body cylinder 420 of sealing module 204, is transmitted through shoulder 423 to the surface of the compression sealing means 376 and is converted into radial forces within sealing means 376. The additional radial forces further radially expand the annular packing seals 378 to increase the radial sealing pressure against the inner surface of pipeline 22, thus enhancing the sealing pressure as the differential pressure increases.

In addition, the anti-extrusion rings 380 function to prevent the outer packing seals 378 from extruding past compression shoulders 413 an 423 into the annulus. Thus the anti-extrusion rings 380 function to preserve the sealing means cavity hereinabove described which is important in maintaining a proper radial seal against pipe 22 at high axial compression forces As hereinabove previously described with regard to the single module sealing apparatus 20, this ability of the differential pressure to enhance the locking and sealing pressures exerted against the inner wall of pipeline 22 is known as "self-energizing". The actuating forces exerted by the slip module actuating means 339 and the sealing module actuating means 436 can be lowered or deenergized as the differential pressure across the sealing module 204 increases until the actuating means 339 and 436 are completely deenergized. The "self-energizing" ability of modules 206 and 204 will maintain the dual-module plugging apparatus 200 in a locked and sealed position within the pipe during subsequent work or repair operations providing the advantages hereinbefore described.

As hereinabove described, since the plugging apparatus 200 will generally be utilized in a condition in which the differential pressure across the sealing module 204, when in the sealed condition, may equal to or exceed the designed working fluid pressure for the pipe, the ability to control the radial pressures exerted by the locking slips 360 and the compression seal 376 is critical in order to prevent overstressing the pipe beyond its designed yield strength. Accordingly, as hereinabove described, the sealing pressure relationship to the differential pressure exerted against the pressure head 421 as applied to the pressure head area can be expressed in the previously given equation. The ratio $A_H/A_S$ is the ratio of the pressure head area to the annular area of the expanded compression seals 378. The other considerations hereinabove expressed with regard to the ratio of the pressure head area to the annular area of the compression seal means 376 are identical to the considerations hereinabove described with regard to the single module plugging apparatus 20.

Compression sealing means 376 may be divided into a plurality of sealing sections, such as sealing means 376a and sealing means 376b. Such a dual sealing arrangement may be desirable in certain high differential pressure situations, and in situations where the pipeline fluid may be a gas and therefore more difficult to seal, or where the fluid may be extremely hazardous or volatile and wherein any leak may be extremely hazardous to personnel working downstream in pipeline 22. Accordingly, a means for draining any leak occuring through the forward sealing means 376a can be provided, assuming that the rear seal 376b will provide a continued positive seal against further rearward leaks. Any pressurized pipeline fluid leaking past the upstream compression seals 378 of the forward sealing means 376a will collect in the annular channel 435 of the sealing means spacer 431. The fluid will then be forced through drainage bore 433 in spacer 431 and sleeve 430 and through connector 502 into the drainage line 500. The leaked pipeline fluid will then be exhausted through connector 498, flexible interconnection hose 496 to the connector 494 in slip module 206. The leaked fluid will then be carried through line 492 to connector 260 and then pass through line 262 and cable 220 to the external receiving tank 268 for further disposition (see FIG. 9). Of course, in many applications, it may not be necessary to utilize such a split compression sealing means arrangement, and any combination of a single sealing means, or multiple split sealing means with means for collecting leaks intermediate such multiple sealing means could be utilized.

When it is desirable to unlock the dual module plugging apparatus 200 from pipeline 22, pressure can be equalized on each side of the slip module 204 and hydraulic pressure applied through the "unlocking" line to connector 230 in the slip module 206 and to the cylinders 352 through line 466, and through line 468 and interconnecting line 472 to the "unlocking" connector 486 in sealing module 204 to apply the "unlocking" fluid pressure through line 476 and inlet 478 to the actuating means 436 of sealing module 204. This application of the "unlocking" pressure to cylinders 352 and 436 will extend their respective actuating piston rods, 350 and 440. The extension of piston rod 350 moves the actuating sleeve 340 axially toward the body closure plate 308 and applies an unlocking force to slips 360 to move the slips from locking engagement with the inner surface of pipeline 22. The extension of actuating rod 440 drives the upstream body cylinders 410 and 420 axially apart and releases the compression forces that are applied to sealing means 376 for breaking the plugging seal with the inner surface of pipeline 22. The positive force exerted by the extension of piston rod 350 of slip module 206 is sufficient to break the frictional securing forces between slips 360 and pipeline 22, but the action of the compressed helical springs 375 enhance this "unlocking" force by applying an unlocking force to the guide rod brackets 373 secured to gussets 342 to drive sleeve 340 toward plate 308.

In addition, in the event of a failure in the hydraulic system which prevents the extension of cylinder rods 350, as the differential pressure is equalized across modules 204 and 206, the compressed springs 375 and elastomeric packing seals 378 cooperate to exert sufficient "unlocking" force against the guide rods brackets 373 to drive the actuating sleeve 340 to its unlocked position, thereby unseating and disengaging slips 360. At the same time, the compression force exerted against seal means 376 is relieved for breaking the plugging seal by slip module 204.

In the further event that the extension of cylinder rods 350 or the force applied by the compression springs 375 fail to unseat slips 360 in slip module 206, then a pigging pressure can be applied to the rear end of the slip module 206. Such pigging pressure will exert axial forces against the closure plate 308 and body cylinder 296 to move body means 290 forwardly with respect to actuating sleeve 340 and slips 360 (locked to the wall of pipe 22), and permitting unseating of slips 360.

While the invention has been disclosed herein in different embodiments, it should be apparent to those skilled in the art that the invention is not so limited but is susceptible to various changes and modifications without departing from the spirit thereof.

We claim:

1. Apparatus for plugging the bore of a pipe at a selected location and withstanding a pressure differential thereacross that may equal or exceed the designed working fluid pressure of the pipe, comprising in combination:

cylindrical body means adapted for insertion into the pipe bore and for axial movement therein, said body means including a pressure head having a selected area;

support means attached to and cooperating with said body means for supporting said body means axially in the pipe during movement therein;

pipe gripping means carried by said body means for locking engagement with the inside surface of the pipe to anchor said body means in said pipe;

compression seal means having a selected annular area and carried by said body means for radially expanding in response to axial force applied thereto for sealingly engaging the inside surface of the pipe and converting said axial force into radial sealing pressure in a predetermined relationship;

an actuating sleeve adapted for limited axial sliding movement within said cylindrical body means; and force applying means mounted within said body means for applying a predetermined axial force to said actuating sleeve to move said sleeve axially within said body means;

said actuating sleeve cooperating with pipe gripping means for driving said pipe gripping means into locking engagement with the pipe in response to said axial force applied thereto by said force applying means.

2. The apparatus as claimed in claim 1, wherein said cylindrical body means and said actuating sleeve have large diameters, relative to the pipe diameter, which provide structural bending rigidity to resist bending forces applied to said body means during movement in the pipe.

3. The apparatus as claimed in claim 1, wherein said cylindrical body means and said actuating sleeve have an engagement length which is sufficient to prevent cocking relative to each other when axial force is applied therebetween.

4. The apparatus as claimed in claim 1, wherein said force applying means is a fluid pressure actuated cylinder disposed axially within said cylindrical body means and actuating sleeve and mounted inside of said body means for engaging said actuating sleeve and applying a predetermined axial force to said sleeve for moving said sleeve relative to said body means in response to fluid pressure applied to said actuating cylinder.

5. The apparatus as claimed in claim 4, further including mechanical force applying means mounted within said body means and cooperating with said actuating sleeve for urging said actuating sleeve in an axial direction for unlocking said gripper means.

6. The apparatus as claimed in claim 5, wherein said mechanical force applying means comprises a helical compression spring concentrically mounted within said body means and engaging said actuating sleeve.

7. Apparatus for plugging the bore of a pipe at a selected location and withstanding a pressure differential thereacross that may equal or exceed the designed working fluid pressure of the pipe, comprising in combination:

cylindrical body means adapted for insertion into the pipe bore and for axial movement therein, said body means including a pressure head having a selected area and a radially extending portion presenting an annular shoulder;

support means attached to and cooperating with said body means for supporting said body means axially in the pipe during movement therein;

a frusto-conical slip support member concentrically disposed around said cylindrical body means and adapted for relative sliding movement with respect thereto, said slip support member having its largest diameter end terminating in an annular shoulder circumferentially disposed around said body means;

a plurality of radially spaced, axially movable slips supported by said slip support member and movable with respect thereto and adapted for wedging into locking engagement with the inside surface of the pipe in response to axial force applied thereto and converting said axial force into radial locking pressure in a predetermined relationship;

a plurality of axially disposed annular elastomeric seal members concentrically disposed on said body means between said slip support member and pressure head shoulders for axial compression therebetween, and having a selected annular area; and actuating means for engaging said plurality of slips and applying a predetermined initial axial force to said seal members for radially expanding said seal members into engagement with said pipe;

wherein said annular seal members in contact with said pressure head shoulder and said slip support member should have circumferentially disposed anti-extrusion springs therein for preventing extrusion of said seal members past said shoulders when axial compression forces are applied thereto.

8. Apparatus for plugging the bore of a pipe at a selected location, comprising in combination:

body means adapted for insertion into the pipe bore and for axial movement therein;

support means attached to and cooperating with said body means for supporting said body means axially in the pipe during movement therein;

pipe gripping means carried by said body means for locking engagement with the inside surface of the pipe to anchor said body means in said pipe;

compression seal means carried by said body means for radially expanding in response to axial force applied thereto for sealingly engaging the inside surface of the pipe and converting said axial force into radial sealing pressure in a predetermined relationship;

actuating means for actuating said pipe gripping means and for applying a predetermined initial axial force to said compression seal means for radially expanding said seal means into engagement with said pipe; and anti-extrusion springs for preventing axial extrusion of said compression seal means when said seal means is radially expanded into engagement with the pipe wall.

9. Apparatus for plugging the bore of a pipe at a selected location, comprising in combination:

body means adapted for insertion into the pipe bore and for axial movement therein, said body means including a radially projecting shoulder circumferentially disposed thereabout;

support means attached to and cooperating with said body means for supporting said body means axially in the pipe during movement therein;

pipe gripping means carried by said body means for locking engagement with the inside surface of the pipe to anchor said body means in said pipe, said gripping means including a radially projecting shoulder circumferentially disposed about said body means and axially movable toward said body means shoulder in response to axial force applied thereto;

a plurality of axially disposed annular elastomeric seal members concentrically disposed on said body means between said body means shoulder and said pipe gripping means shoulder for axial compression and radial expansion in response to axial forces applied thereto;

actuating means for actuating said pipe gripping means and for applying a predetermined initial axial force to said seal members for radially expanding said seal members into engagement with said pipe; and anti-extrusion means for preventing axial extrusion of said compression seal members when said seal means is radially expanded into engagement with the pipe wall.

10. The apparatus as claimed in claim 9, wherein said anti-extrusion means is circumferentially disposed anti-extrusion springs within the annular seal members for preventing extrusion of said seal members past said shoulder when axial compression forces are applied thereto.

11. Apparatus for plugging the bore of a pipe at a selected location and withstanding a pressure differential thereacross that may equal or exceed the designed working fluid pressure of the pipe, comprising in combination:

cylindrical body means adapted for insertion into the pipe bore and for axial movement therein, said body means including a pressure head having a selected surface area;

support means attached to and cooperating with said body means for supporting said body means axially in the pipe during movement therein;

a slip support member mounted on said body means;

wherein said slip support member comprises a frusto-conical member concentrically disposed around said cylindrical body means and adapted for relative sliding movement with respect thereto, said frusto-conical member having its largest diameter end terminating in an annular shoulder circumferentially disposed around said body means;

a plurality of radially spaced, axially movable slips supported by said slip support member and movable with respect thereto and adapted for wedging into locking engagement with the inside surface of the pipe in response to axial force applied thereto and converting said axial force into radial locking pressure in a predetermined relationship;

compression seal means having a selected annular area and carried by said body means for radially expanding in response to axial force applied thereto for sealingly engaging the inside surface of the pipe and converting said axial force into radial sealing pressure in a predetermined relationship; and actuating means for engaging said plurality of slips and applying a predetermined initial axial force to said slips for moving said slips in relation to said slip support member and into locking engagement with the pipe wall and to said compression seal means for radially expanding said seal means into engagement with said pipe.

12. The apparatus as claimed in claim 11, wherein said body means pressure head includes a radially extending portion presenting an annular shoulder axially spaced from said slip support member annular shoulder, and wherein said compression seal means comprises a plurality of axially disposed annular elastomeric seal members concentrically disposed on said body means between said slip support member and pressure head shoulders for axial compression therebetween.

13. The apparatus as claimed in claim 12, wherein said annular seal members in contact with said pressure head shoulder and said slip support member shoulder have circumferentially disposed anti-extrusion springs therein for preventing extrusion of said seal members past said shoulders when axial compression forces are applied thereto.

14. Apparatus for plugging the bore of a pipe at a selected location and withstanding a pressure differential thereacross that may equal or exceed the designed working fluid pressure of the pipe, comprising in combination:

cylindrical body means adapted for insertion into the pipe bore and for axial movemet therein, said body means including a pressure head having a selected area;

support means attached to and cooperating with said body means for supporting said body means axially in the pipe during movement therein;

a slip support member mounted on said body means;

a plurality of radially spaced axially movable slips supported by said slip support member and movable with respect thereto and adapted for wedging into locking engagement with the inside surface of the pipe in response to axial force applied thereto and converting said axial force into radial locking pressure in a predetermined relationship;

compression seal means having a selected annular area and carried by said body means for radially expanding in response to axial force applied thereto for sealingly engaging the inside surface of the pipe and converting said axial force into radial sealing pressure in a predetermined relationship;

an actuating sleeve adapted for limited axial sliding movement within said cylindrical body means; and a hydraulic actuating cylinder mounted within said body means for applying a predetermined axial force to said actuating sleeve to move said sleeve axially within said body means;

said actuating sleeve cooperating with said slips for driving said slips axially relative to said slip support member into locking engagement with the pipe in response to said axial force applied thereto by said hydraulic cylinder.

* * * * *